(12) United States Patent
Raslambekov

(10) Patent No.: US 11,191,620 B1
(45) Date of Patent: Dec. 7, 2021

(54) SYSTEMS AND METHODS FOR GENERATING AN AUGMENTED 3D DIGITAL MODEL OF AN ANATOMICAL STRUCTURE OF A SUBJECT

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/338,610

(22) Filed: Jun. 3, 2021

(51) Int. Cl.
| | |
|---|---|
| A61C 7/00 | (2006.01) |
| G06T 17/20 | (2006.01) |
| G06T 15/04 | (2011.01) |
| G06T 5/00 | (2006.01) |

(52) U.S. Cl.
CPC .............. *A61C 7/002* (2013.01); *G06T 5/002* (2013.01); *G06T 15/04* (2013.01); *G06T 17/205* (2013.01); *G06T 2207/30036* (2013.01)

(58) Field of Classification Search
None
See application file for complete search history.

(56) References Cited

U.S. PATENT DOCUMENTS

| | | | |
|---|---|---|---|
| 5,995,110 A | 11/1999 | Litwinowicz | |
| 6,853,373 B2 | 2/2005 | Williams et al. | |
| 8,174,535 B2 | 5/2012 | Berger et al. | |
| 8,963,958 B2* | 2/2015 | Berger | G06T 15/04 |
| | | | 345/646 |
| 10,010,387 B2 | 7/2018 | Esbech et al. | |
| 10,347,031 B2* | 7/2019 | Wu | G06T 15/04 |
| 10,679,408 B2* | 6/2020 | Ceylan | G06T 7/13 |
| 10,945,812 B1 | 3/2021 | Raslambekov | |
| 10,950,061 B1 | 3/2021 | Raslambekov | |
| 10,993,782 B1 | 5/2021 | Raslambekov | |

(Continued)

FOREIGN PATENT DOCUMENTS

| | | |
|---|---|---|
| CN | 104680573 B | 8/2018 |
| EP | 3376157 A1 | 9/2018 |

OTHER PUBLICATIONS

S. Barone, A. Paoli and A. V. Razionale, "3D maxillofacial model creation for computer-guided treatments in oral rehabilitation," 2012 18th International Conference on Virtual Systems and Multimedia, 2012, pp. 421-428, doi: 10.1109/VSMM.2012.6365954. (Year: 2012).*

(Continued)

*Primary Examiner* — James A Thompson
(74) *Attorney, Agent, or Firm* — BCF LLP

(57) ABSTRACT

A method and a system for generating an augmented 3D digital model of an intraoral anatomical structure a subject. The method comprises: obtaining a 3D digital model of the intraoral anatomical structure including a plurality of mesh elements representative of a surface of the intraoral anatomical structure; generating, based on the 3D digital model, a 2D grid comprising an unfolded surface of the 3D digital model; the 2D grid including a plurality of 2D cells; assigning, to each one of the plurality of 2D cells, a respective value of at least one textural parameter, thereby generating a texture reference map; and based on the texture reference map, causing application of the at least one textural parameter to the 3D digital model to generate the augmented 3D digital model of the intraoral anatomical structure.

20 Claims, 8 Drawing Sheets

(56) References Cited

U.S. PATENT DOCUMENTS

| | | | |
|---|---|---|---|
| 2012/0015316 A1* | 1/2012 | Sachdeva | A61C 13/0004 433/24 |
| 2013/0162633 A1* | 6/2013 | Berger | G09G 5/00 345/419 |
| 2015/0187126 A1* | 7/2015 | Magder | G06T 15/04 345/426 |
| 2017/0103569 A1* | 4/2017 | Wu | A61B 5/0088 |
| 2018/0025529 A1* | 1/2018 | Wu | A61B 5/0088 345/426 |
| 2018/0247446 A1 | 8/2018 | Litvin | |
| 2019/0259220 A1* | 8/2019 | Lancelle | G06T 15/04 |
| 2020/0000551 A1* | 1/2020 | Li | A61C 9/0053 |
| 2020/0170760 A1* | 6/2020 | Dawood | G06K 9/4652 |
| 2020/0360109 A1* | 11/2020 | Gao | G06T 19/20 |

OTHER PUBLICATIONS

U.S. Appl. No. 17/143,074, filed Jan. 6, 2021.
U.S. Appl. No. 16/936,937, filed Jan. 6, 2021.
U.S. Appl. No. 17/338,143, filed Jun. 3, 2021.

* cited by examiner

SYSTEMS AND METHODS FOR GENERATING AN AUGMENTED 3D DIGITAL MODEL OF AN ANATOMICAL STRUCTURE OF A SUBJECT

FIELD

The present technology relates generally to systems and methods for determining an orthodontic treatment for a subject, and, in particular to methods and systems for generating augmented 3D digital models of intraoral anatomical structures of the subject.

BACKGROUND

In orthodontics, treatments for achieving alignment of malposed teeth in a subject may include applying dental appliances, such as orthodontic aligners, causing subject's teeth to move to a desired position thereof, for example, that associated with their alignment. Orthodontic aligners are typically worn over teeth of an arch form in order to exert a force to the subject's teeth to move the teeth to a desired position, such as to align malocclusions.

To ensure safety and efficacy of the orthodontic treatment, planning of the orthodontic treatment may typically include obtaining various anthropometric parameters of subject's intraoral anatomy, including those of the subject's teeth and a subject's gingiva, as an example. Such parameters may be obtained via corresponding image data representative of the subject's intraoral anatomy.

For example, by applying intra-oral scanning techniques, 3D digital models (such as 3D meshes) of crown portions of the subject's teeth and the subject's gingiva may be obtained, and some anthropometric parameters associated therewith may be used for developing the orthodontic treatment. Broadly speaking, these parameters, for a given tooth, may include, for example, overall dimensions of a crown portion thereof, a number of cusps, and certain other anatomical features associated therewith, such as data indicative of lobes, developmental grooves, a marginal ridge, and the like.

Further, for a more efficient planning of the orthodontic treatment, it may also be practical to obtain more realistic respective 3D digital models of the intraoral anatomical structures of the subject by applying a texture thereto, such as colors and shades to reflect surface roughness and the like.

Application of texture on the 3D digital models of the intraoral anatomical structures may enable a more illustrative presentation of the planned orthodontic treatment to the subject aiding the subject in understanding certain details of the anatomical structure or the orthodontic treatment. For example, the presentation of the planned orthodontic treatment using more realistic, texturized, 3D digital models of the subject's teeth and the subject's gingiva may help the subject better understand key aspects of the orthodontic treatment, and may thus help them overcome certain anxieties before receiving the orthodontic treatment, which may typically be associated with fear of pain, the unknown, or an undesired result of the treatment. This may further allow for better adherence of the subject to the orthodontic treatment, which may thus increase its efficacy.

Certain prior art approaches have been proposed related to generating texturized 3D digital models.

U.S. Pat. No. 10,347,031-B2 issued on Jul. 9, 2019, assigned to Carestream Dental Technology, and entitled "Apparatus and Method of Texture Mapping for Dental 3D Scanner" discloses a method for color texture imaging of teeth with a monochrome sensor array to obtain a 3-D mesh representing a surface contour image according to image data from views of the teeth. For each view, recording image data generates sets of at least three monochromatic shading images. Each set of the monochromatic shading images is combined to generate 2-D color shading images, corresponding to one of the views. Each polygonal surface in the mesh is assigned to one of a subset of the views. Polygonal surfaces assigned to the same view are grouped into a texture fragment. Image coordinates for the 3-D mesh surfaces in each texture fragment are determined from projection of vertices onto the view associated with the texture fragment. The 3-D mesh is rendered with texture values in the 2-D color shading images corresponding to each texture fragment to generate a color texture surface contour image.

U.S. Pat. No. 10,679,408-B2 issued on Jun. 9, 2020, assigned to Adobe Inc., and entitled "Generating a Three-dimensional Model from a Scanned Object" discloses systems and methods that facilitate scanning an object (e.g., a three-dimensional object) having custom mesh lines thereon and generating a three-dimensional mesh of the object. For example, a three-dimensional modeling system receives a scan of the object including depth information and a two-dimensional texture map of the object. The three-dimensional modeling system further generates an edge map for the two-dimensional texture map and modifies the edge map to generate a two-dimensional mesh including edges, vertices, and faces that correspond to the custom mesh lines on the object. Based on the two-dimensional mesh and the depth information from the scan, the three-dimensional modeling system generates a three-dimensional model of the object.

U.S. Pat. No. 8,963,958-B2 issued on Feb. 24, 2015, assigned to 3D Systems Inc Geomagic Inc., and entitled "Apparatus and Methods for Adjusting a Texture Wrapped onto the Surface of a Virtual Object" discloses techniques for wrapping a two-dimensional texture conformally onto a surface of a three dimensional virtual object within an arbitrarily-shaped, user-defined region. The techniques provide minimum distortion and allow interactive manipulation of the mapped texture. The techniques feature an energy minimization scheme in which distances between points on the surface of the three-dimensional virtual object serve as set lengths for springs connecting points of a planar mesh. The planar mesh is adjusted to minimize spring energy, and then used to define a patch upon which a two-dimensional texture is superimposed. Points on the surface of the virtual object are then mapped to corresponding points of the texture. A haptic/graphical user interface element that allows a user to interactively and intuitively adjust texture mapped within the arbitrary, user-defined region.

SUMMARY

It is an object of the present technology to ameliorate at least some of the inconveniences present in the prior art.

Developers of the present technology have noted that conventional approaches to applying texture to 3D digital models of intraoral anatomical structures include assigning respective values of a given textural parameter, such as a color, to each mesh element of a given 3D digital model. However, implementation of such an approach may be associated with significant computational costs as respective spatial positions of the mesh elements within the given 3D digital models should be predetermined, which may be challenging given their number and unordered distribution.

The developers of the present technology have realized that re-distributing vertices of mesh elements within a given 3D digital model of a respective intraoral anatomical structure, such as a tooth or gingiva of the subject, according to a predetermined rule to obtain an ordered distribution thereof may allow expediting the process of determining the respective spatial positions of the mesh elements within the given 3D digital model.

Further, the developers have appreciated that assigning respective values of a given textural parameter to the mesh elements of the given 3D digital model may be executed in a more efficient manner if a surface of the given 3D digital model could be converted in a two-dimensional space in a form of a 2D grid, each cell of which corresponds to a respective mesh element of the given 3D digital model. In this regard, the 2D gird including the assigned respective values of the given textural parameter may be used, by a graphics processor, as a texture reference map to apply the given textural parameter to the given 3D digital model.

Thus, by reducing the dimensionality of the given 3D digital model of the respective intraoral anatomical structure for assigning the respective values of the given textural parameter to the mesh elements thereof, the present methods and systems are directed to reducing computational burden on a computing system, including the graphics processor, which may further allow generating augmented respective 3D digital models of the intraoral anatomical structures of the subject including the texture applied thereon over a shorter time, or processing a larger number of such requests in a same timeframe.

The methods and systems described herein may be used to obtain augmented 3D digital models of other anatomical structures of the subject, such as a subject's skull and/or separate portions thereof, such as separate bones thereof, for example, using 3D mesh models of those other anatomical structures.

Thus, the augmented respective 3D digital models of the intraoral anatomical structures of the subject including the texture applied thereon may allow effectively differentiating various portions thereof. For example, using an augmented 3D digital model of a given tooth of the subject may allow differentiating a crown portion and a root portion thereof, which may assist a clinician in determining or rendering orthodontic treatments. Such orthodontic treatments may include determining a desired position of the given tooth based on the augmented 3D digital model.

Thus, in accordance with a first broad aspect of the present technology, there is provided a method of generating an augmented 3D digital model of an intraoral anatomical structure of a subject. The method is executed by a processor. The method comprises: obtaining, by the processor, a 3D digital model of the intraoral anatomical structure, the 3D digital model including a plurality of mesh elements representative of a surface of the intraoral anatomical structure; the 3D digital model being an untextured 3D digital model of the intraoral anatomical structure; generating, by the processor, based on the 3D digital model, a 2D grid, the 2D grid comprising an unfolded surface of the 3D digital model; the 2D grid including a plurality of 2D cells, a given one of which corresponds to a respective one of the plurality of mesh elements of the 3D digital model; assigning, by the processor, to each one of the plurality of 2D cells, a respective value of at least one textural parameter, thereby generating a texture reference map; based on the texture reference map, causing application of the at least one textural parameter to the 3D digital model to generate the augmented 3D digital model of the intraoral anatomical structure; storing the augmented 3D digital model of the intraoral anatomical structure in a memory device communicatively coupled to the processor.

In some implementations of the method, vertices of the plurality of mesh elements are distributed non-uniformly over a surface of the 3D digital model of the intraoral anatomical structure.

In some implementations of the method, the method further comprises, prior to the generating the 2D grid, uniformly redistributing the vertices of the plurality of mesh elements.

In some implementations of the method, the uniformly redistributing comprises applying a subdivision surface algorithm.

In some implementations of the method, the subdivision surface algorithm is a Catmull-Clark subdivision surface algorithm.

In some implementations of the method, the method further comprises, prior to the generating the 2D grid, smoothing the 3D digital model by applying a Harmonic function.

In some implementations of the method, the unfolded surface of the 3D digital model includes at least two areas indicative of respective portions of the intraoral anatomical structure, and the method further comprises: assigning, to each one of the plurality of 2D cells associated with one of the at least two areas of the unfolded surface, a first value of the at least one textural parameter; and assigning, to each one of the plurality of 2D cells associated with an other one of the at least two areas of the unfolded surface, a second value of the at least one textural parameter, the second value being different from the first value.

In some implementations of the method, each one of the at least two areas are separated by a border line, and the method further comprises: assigning to each one of the plurality of 2D cells associated with the border line between the at least two areas of the unfolded surface, a third value of the at least one textural parameter, the third value being different from the second value and the first value.

In some implementations of the method, the third value is determined based on the first value and the second value of the at least one textural parameter.

In some implementations of the method, the third value is an average value between the first value and the second value of the at least one textural parameter.

In some implementations of the method, the intraoral anatomical structure is a subject's tooth; the at least two areas of the unfolded surface of the 3D digital model are indicative of a crown portion and a root portion of the subject's tooth, respectively; and the border line between the at least two areas is indicative of a segmentation loop between the crown portion and the root portion of the subject's tooth.

In some implementations of the method, the method further comprises, prior to the generating the 2D grid, restoring the root portion of the subject's tooth within the 3D digital model based on a parametric model of the root portion.

In some implementations of the method, the at least one textural parameter includes one or more of: a color parameter, a light intensity parameter, a dimming parameter, and a transparency parameter.

In some implementations of the method, the intraoral anatomical structure is at least one of: a subject's tooth and a subject's gingiva.

In some implementations of the method, the method further comprises causing, by the processor, display of the augmented 3D digital model of the intraoral anatomical structure.

In some implementations of the method, the method further comprises using the augmented 3D digital model of the intraoral anatomical structure for determining an orthodontic treatment for the subject.

In some implementations of the method, the method further comprises causing a manufacture of an orthodontic appliance based on the augmented 3D digital model of the intraoral anatomical structure or the determined orthodontic treatment for the subject.

In accordance with a second broad aspect of the present technology, there is provided a method of generating an augmented 3D digital model of an anatomical structure of a subject. The method is executed by a processor. The method comprises: obtaining, by the processor, a 3D digital model of the anatomical structure, the 3D digital model including a plurality of mesh elements representative of a surface of the anatomical structure; the 3D digital model being an untextured representation of the anatomical structure; generating, by the processor, based on the 3D digital model, a 2D grid, the 2D grid comprising an unfolded surface of the 3D digital model; the 2D grid including a plurality of 2D cells, a given one of which corresponds to a respective one of the plurality of mesh elements of the 3D digital model; assigning, by the processor, to each one of the plurality of 2D cells, a respective value of at least one textural parameter, thereby generating a texture reference map; based on the texture reference map, causing application of the at least one textural parameter to the 3D digital model to generate the augmented 3D digital model of the anatomical structure; causing display of the augmented 3D digital model of the anatomical structure.

In accordance with a third broad aspect of the present technology, there is provided a system for generating an augmented 3D digital model of an intraoral anatomical structure of a subject. The system includes: a processor and non-transitory memory device storing instructions. The processor, upon executing the instructions, is configured to: obtain a 3D digital model of the intraoral anatomical structure, the 3D digital model including a plurality of mesh elements representative of a surface of the intraoral anatomical structure; the 3D digital model being an untextured representation of the intraoral anatomical structure; generate, based on the 3D digital model, a 2D grid, the 2D grid comprising an unfolded surface of the 3D digital model; the 2D grid including a plurality of 2D cells, a given one of which corresponds to a respective one of the plurality of mesh elements of the 3D digital model; assign, to each one of the plurality of 2D cells, a respective value of at least one textural parameter, thereby generating a texture reference map; based on the texture reference map, cause application of the at least one textural parameter to the 3D digital model to generate the augmented 3D digital model of the intraoral anatomical structure; store the augmented 3D digital model of the intraoral anatomical structure in the non-transitory memory device.

In some implementations of the system, vertices of the plurality of mesh elements are distributed non-uniformly over a surface of the 3D digital model of the intraoral anatomical structure.

In some implementations of the system, prior to generating the 2D grid, the processor is further configured to redistribute the vertices of the plurality of mesh elements uniformly.

In some implementations of the system, the to redistribute the vertices uniformly, the processor is configured to apply a subdivision surface algorithm.

In some implementations of the system, the at least one textural parameter includes one or more of: a color parameter, a light intensity parameter, a dimming parameter, and a transparency parameter.

In accordance with a fourth broad aspect of the present technology, there is provided a system for generating an augmented 3D digital model of an intraoral anatomical structure of a subject. The system includes: a processor and non-transitory memory device storing instructions. The processor, upon executing the instructions, is configured to: obtain a 3D digital model of the intraoral anatomical structure, the 3D digital model including a plurality of mesh elements representative of a surface of the intraoral anatomical structure; the 3D digital model being an untextured representation of the intraoral anatomical structure; generate, based on the 3D digital model, a 2D grid, the 2D grid comprising an unfolded surface of the 3D digital model; the 2D grid including a plurality of 2D cells, a given one of which corresponds to a respective one of the plurality of mesh elements of the 3D digital model; assign, to each one of the plurality of 2D cells, a respective value of at least one textural parameter, thereby generating a texture reference map; based on the texture reference map, cause application of the at least one textural parameter to the 3D digital model to generate the augmented 3D digital model of the intraoral anatomical structure; causing display of the augmented 3D digital model of the intraoral anatomical structure.

In some implementations of the system, vertices of the plurality of mesh elements are distributed non-uniformly over a surface of the 3D digital model of the intraoral anatomical structure.

In some implementations of the system, prior to generating the 2D grid, the processor is further configured to redistribute the vertices of the plurality of mesh elements uniformly.

In some implementations of the system, the to redistribute the vertices uniformly, the processor is configured to apply a subdivision surface algorithm.

In some implementations of the system, the at least one textural parameter includes one or more of: a color parameter, a light intensity parameter, a dimming parameter, and a transparency parameter.

In the context of the present specification, the term "orthodontic treatment" is broadly referred to as any type of medical intervention aimed at correcting malocclusions associated with the subject's teeth or moving the patient's teeth for any reason, including surgical and non-surgical manipulations, such as, but not limited to, using one or more of aligners, brackets, multi-strand wires, strips, retainers, and plates. Further, the orthodontic treatment, as referred to herein, may be determined manually by a professional practitioner (such as an orthodontist, a maxillofacial surgeon, for example), automatically by a specific software based on image data and input parameters associated with the subject, and/or a combination of manual and automatic.

Also, as used herein, determining the orthodontic treatment may include verification of an already determined orthodontic treatment, for example, by modelling an effect of the determined orthodontic treatment using respective 3D models (such as 3D meshes) of the subject's teeth. The verification may be conducted, for example, to ensure safety and effectiveness of the determined orthodontic treatment for the subject.

In the context of the present specification, the term "texture" applied to a 3D digital model of a given object (such as an intraoral anatomical structure of a subject) broadly refers to at least one of respective color values (for example, those of a given color palette, such as a Red Blue Green (RGB) palette), surface details, and certain visual properties, for example, applied to each structural element of the 3D digital model (such as mesh elements thereof) that are indicative of respective physical properties of a surface of the given object, including, for example, colors, shades, translucency, dimming, smoothness, and the like. Thus, by applying the texture to the 3D digital model, a more realistic 3D digital model of the given object may be obtained.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
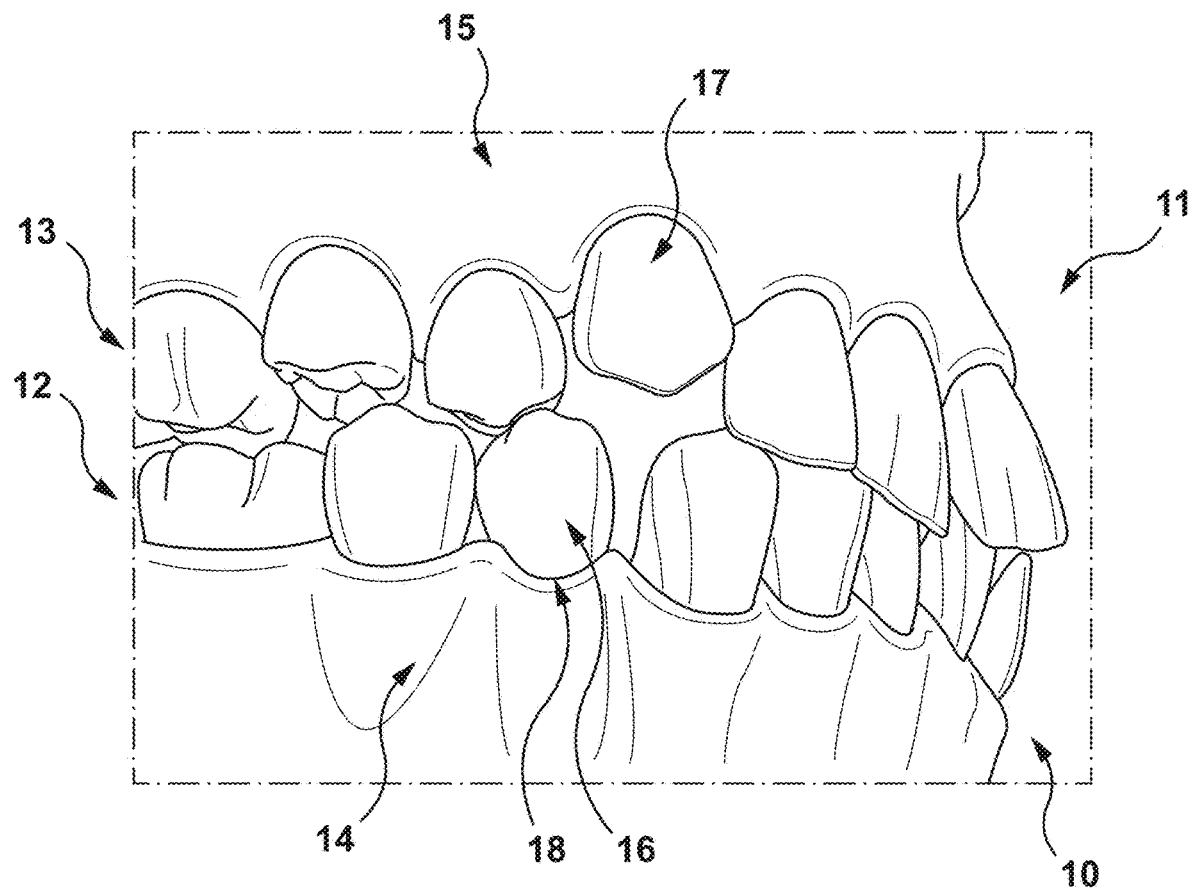
FIG. 1 depicts a perspective view of certain intraoral anatomical structures of a subject including a lower arch form and an upper arch form of the subject depicting examples of malocclusions of some of subject's teeth, in accordance with certain non-limiting embodiments of the present technology.

It should be noted that, unless otherwise explicitly specified herein, the drawings are not to scale.

DETAILED DESCRIPTION

Certain aspects and embodiments of the present technology are directed to methods of and systems for applying a texture to 3D digital models of subject's anatomical structures to generate augmented 3D digital models thereof, which may further be used for determining the orthodontic treatment for the subject and subsequent manufacture of an orthodontic appliance for implementing at least a portion of the orthodontic treatment.

More specifically, certain aspects and embodiments of the present technology comprise a computer-implemented method of generating an augmented 3D digital model of a given subject's anatomical structure (such as a subject's tooth and/or a subject's gingiva) by applying the texture to a respective 3D digital model thereof; and based on the augmented 3D digital model of the given subject's anatomical structure, modelling tooth movements of the subject's teeth to determine the orthodontic treatment for the subject. For example, the augmented 3D digital model of the given subject's anatomical structure may be used by the practicing clinician involved in development of the orthodontic treatment for a more accurate monitoring of mutual positions of the subject's anatomical structures when simulating the tooth movements in the course of the orthodontic treatment. Additionally, the augmented 3D digital model may be used for visualizing stages of the so planned orthodontic treatment.

Certain embodiments of the present technology minimize, reduce or avoid some of the problems noted with the prior art. For example, by implementing certain embodiments of the present technology, realistic 3D digital models of the given subject's anatomical structure may be obtained whilst minimizing computational resource consumption on processing the respective 3D digital model thereof.

For example, reducing the computational resources may be achieved by assigning values of at least one textural parameter to the respective 3D digital model using a 2D gird comprising an unfolded surface thereof such that each cell of the 2D grid corresponds to a respective mesh element of the respective 3D digital model. More specifically, using the 2D grid may allow a computing system to more effectively apply the at least one textural parameter to the respective 3D digital model as opposed to predetermining coordinates (such as 3D coordinates) of vertices within the respective 3D digital model and further assigning the values of the at least one textural parameter directly to respective mesh elements thereof.

Further, the reducing the computational resources of the computing system may also be achieved, inter alia, by re-distributing, prior to generating the 2D grid associated with the respective 3D digital model, the vertices within the surface thereof according to a predetermined rule, such as, without limitation, a uniform distribution. Thus, so ordered mesh elements of the respective 3D digital model of the given subject's anatomical structure may allow for more efficient identification thereof when assigning the values of the at least one textural parameter. For example, such pre-processing of the respective 3D digital model of the given subject's anatomical structure to generate the 2D grid associated therewith will allow a graphics processing unit (GPU), or other component, of the computing system to generate the augmented 3D digital model over a shorter time. The decreased computational resource requirement in generating the augmented 3D digital model may also enable the processing of a larger number of augmented 3D digital models within a given timeframe.

In this way, embodiments of the present technology can generate augmented 3D digital models of the subject's anatomical structure whilst reducing or minimizing computational resources without compromising a quality of the augmentation.

There are many possible uses of the augmented 3D digital model.

In certain non-limiting embodiments of the present technology, the augmented 3D digital model may allow increasing safety and effectiveness of the orthodontic treatment by a more accurate planning thereof. More specifically, using the augmented 3D digital models of the subject's intraoral anatomical structures, for example, for modelling tooth movements of the subject's teeth may allow preventing causing damages thereto during the implementation of the orthodontic treatment. For example, when planning tooth movements of a given tooth including extrusion thereof from an associated gingiva, an augmented 3D digital model of the given tooth may allow preventing exposing a root portion thereof, which may result in increased chances of developing tooth decay or sensitivity in the exposed area in future. In another example, when planning tooth movements of the given tooth including an intrusion thereof in the associated gingiva, the augmented 3D digital model of the given tooth may allow preventing impaction of a crown portion of the given tooth in the associated gingiva, which may result in pressure in the affected area further causing pain and bleeding to the subject.

In certain non-limiting embodiments of the present technology, the effectiveness of the orthodontic treatment may be achieved by a more effective visualization of the planned orthodontic treatment using the so generated augmented 3D digital models of the subject's intraoral anatomical structures. In this regard, the augmented 3D digital models of the subject's intraoral anatomical structures may help the subject to overcome certain fears associated with receiving the forthcoming orthodontic treatment, including, for example, the fear of the unknown, fear of pain, and fear of failure to achieve the planned result of the orthodontic treatment. Further, preventing such anxieties before providing the orthodontic treatment may thus allow enhancing subject's adherence to the orthodontic treatment, thereby increasing its overall effectiveness. The augmented 3D digital models may also help the subject or the clinician choose between different orthodontic treatment options based on cosmetic considerations.

Orthodontic Treatment

With initial reference to FIG. 1, there is depicted a perspective view of a lower arch form 10 and an upper arch form 11 of the subject (not depicted), to which certain aspects and non-limiting embodiments of the present technology may be applied.

As can be appreciated, the lower arch form 10 includes lower teeth 12 and lower gingiva 14; and the upper arch form 11 includes upper teeth 13 and upper gingiva 15. Further, in the depicted embodiments of FIG. 1, positions of at least some of the lower teeth 12 within the lower arch form 10 and those of the upper teeth 13 within the upper arch form 11 may be indicative of certain orthodontic disorders of the subject. For example, at least a given lower tooth 16 and a given upper tooth 17 are misaligned within a respective one of the lower arch form 10 and the upper arch form 11. Further, as the given lower tooth 16 is abnormally embedded within the lower teeth 12 while the given upper tooth 17 abnormally protrudes over opposing ones of the lower teeth 12, the misalignment thereof may affect the bite of the teeth, or, in other words, cause a malocclusion—that is, an irregular spatial relationship—between the lower teeth 12 and the upper teeth 13.

Other malocclusions (not depicted) associated with misalignment of lower teeth 12 relative to each other and the upper teeth 13, according to certain non-limiting embodiments of the present technology, may include, without limitation; overbites, underbites, crossbites, openbites, crowding of some of the lower teeth 12 and the upper teeth 13, midline shift therebetween, and others.

In some non-limiting embodiments of the present technology, for resolving the above-mentioned malocclusions, an orthodontic treatment may be provided to the subject.

In some non-limiting embodiments of the present technology, the orthodontic treatment may comprise applying an orthodontic appliance to the subject's teeth. Generally speaking, the orthodontic appliance may be configured to exert a respective predetermined force onto at least some of the lower teeth 12 and the upper teeth 13—such as the given lower tooth 16 and the given upper tooth 17, causing them to move towards an aligned position, thereby restoring the normal occlusion of the lower teeth 12 relative to upper teeth 13 of the subject. More specifically, in the depicted embodiments of FIG. 1, the orthodontic appliance may be configured to cause the given lower tooth 16 to move outwardly between lower teeth adjacent thereto; and further cause clockwise rotation thereof. Further, the orthodontic appliance may be configured to cause the given upper tooth 17 to move inwardly. In various non-limiting embodiments of the present technology, the orthodontic appliance may comprise orthodontic appliances of different types, shapes, sizes and configurations, such as those including, without limitation, aligners, brackets, multi-strand wires, strips, retainers, and plates.

In some non-limiting embodiments of the present technology, the orthodontic appliance may be selected, in the course of the orthodontic treatment to correct a respective malocclusion. For example, in some non-limiting embodiments of the present technology, the orthodontic appliance may include a biteplate (not depicted) used for correcting the overbites. More specifically, the biteplate may be configured for preventing front ones of upper teeth 13 overlap front ones of the lower teeth 12 for extended periods of time.

Further, in some non-limiting embodiments of the present technology, the orthodontic appliance may include a bitesplint (not depicted), which may be applied to the lower teeth 12 for correcting the crossbites—a lateral misalignment of one of the lower arch form 10 and the upper arch form 11 resulting, for example, in buccal surfaces of some of the upper teeth 13 overlapping lingual surfaces of opposing ones thereof of the lower teeth 12. To that end, the bitesplint may be configured for preventing the subject from biting completely, which may further allow correcting the crossbites.

Figure 2:
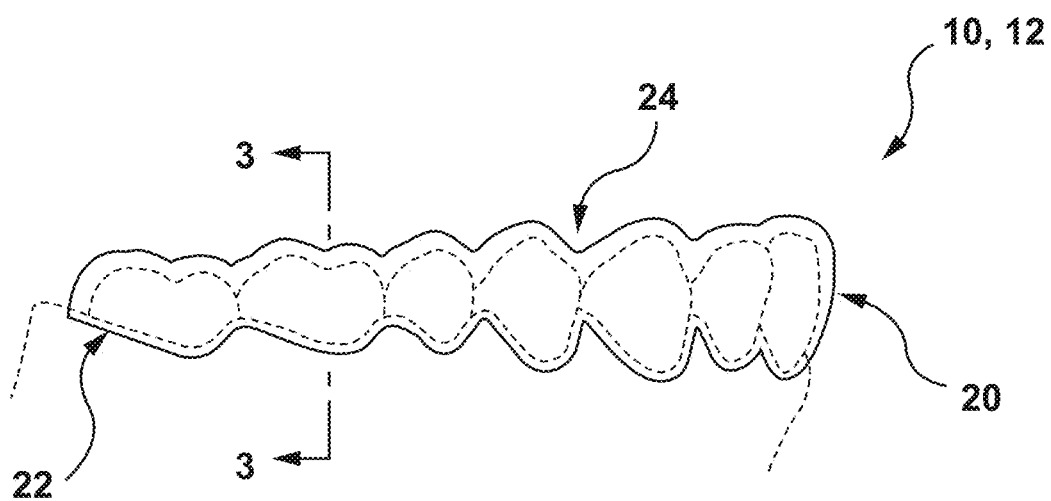
FIGS. 2 and 3 depict a side view and a cross-sectional view through line 3-3, respectively, of a dental appliance applied to the subject's teeth that may be configured to treat the malocclusions of the subject's teeth present in FIG. 1, in accordance with certain non-limiting embodiments of the present technology.
Figure 3:
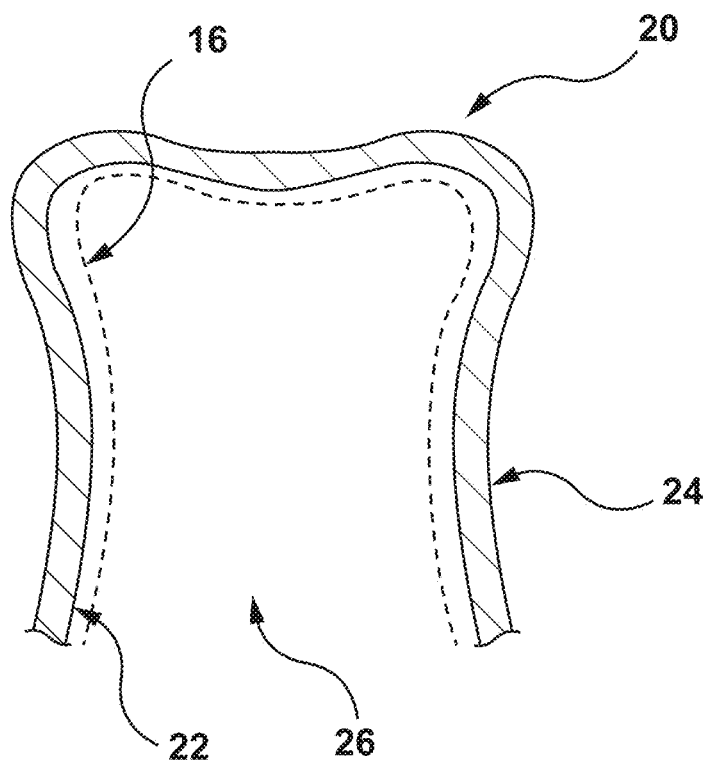

In specific non-limiting embodiments of the present the present technology, the orthodontic appliance may include at least one aligner. With reference to FIGS. 2 and 3, there is depicted an aligner 20 applied to at least some of the lower teeth 12, in accordance with certain non-limiting embodiments of the present technology. The aligner 20 comprises an inner surface 22 and an outer surface 24. The inner surface 22 defines a channel 26, which is configured, in some non-limiting embodiments of the present technology, for receiving crown portions of at least some of the lower teeth 12, such as the given lower tooth 16. However, in other non-limiting embodiments of the present technology, the channel 26 of the aligner 20 may be configured to receive crown portions of all of the lower teeth 12. At least one edge (also referred to herein as an "open edge") of the channel 26 is shaped for following a gum line (not depicted) along the lower gingiva 14.

It will be appreciated that, in accordance with certain non-limiting embodiments of the present technology, the aligner 20 may be used for treating different teeth malocclusions, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 20 to the lower teeth 12 may further include applying specific attachments thereto.

As may become apparent, the aligner 20 may be designed in such a way that its inner surface 22 is configured to impose respective forces on one or more of the lower teeth 12 to obtain a desired position of the lower teeth 12 at a given stage of the orthodontic treatment.

Needles to say that, although in the depicted embodiments of FIGS. 2 and 3, the aligner 20 is configured to be applied onto the lower teeth 12, in other non-limiting embodiments of the present technology, a respective configuration of the aligner 20 may be applied to the upper teeth 13 of the subject for treating misalignment of at least some thereof—such as the given upper tooth 17. By so doing, the desired occlusion between the lower teeth 12 and the upper teeth 13 may be attained.

According to certain non-limiting embodiments of the present technology, the aligner 20 may be made of a polymer, such as a thermoplastic material. In other non-limiting embodiments of the present technology, the aligner 20 may be made of poly-vinyl chloride (PVC). In yet other non-limiting embodiments of the present technology, the aligner 20 may be made of polyethylene terephthalate glycol (PETG). Other suitable materials can also be used to form the aligner 20.

In some non-limiting embodiments of the present technology, the aligner 20 may be manufactured using additive manufacturing techniques, such as 3D printing techniques where the aligner 20 is formed by printing according to a pre-generated 3D digital model thereof.

In other non-limiting embodiments of the present technology, the aligner 20 may be produced by a thermoforming process where (1) an unfinished aligner is produced, using a preform, on a respective aligner mold (not depicted) associated with a respective stage of the orthodontic treatment, which is configured to shape the inner surface 22 of the aligner 20; and (2) the unfinished aligner is cut along a predetermined cut line to remove excess material therefrom, thereby producing the aligner 20, the predetermined cut line defining the at least one edge of the channel 26 of the aligner 20.

In specific non-limiting embodiments of the present technology, the aligner 20 may be manufactured in accordance with one or more methods described in a co-owned U.S. patent application Ser. No. 17/143,074 filed on Jan. 6, 2021, entitled "SYSTEMS AND METHODS FOR FORMING A DENTAL APPLIANCE," the content of which is incorporated herein by reference in its entirety.

As it may become apparent, to produce the aligner 20 for achieving the desired occlusal relationship between the lower teeth 12 and the upper teeth 13 during the orthodontic treatment, the tooth movements of subject's teeth to which the aligner 20 is to be applied to should be carefully planned, based on respective 3D digital models (such as 3D meshes, as will be described below) of the lower arch form 10 and the upper arch form 11, for example, to determine respective forces applied to the subject's teeth during respective stages of the orthodontic treatment. For example, the respective 3D digital models of each one of the lower arch form 10 and the upper arch form 11 of the subject may be generated using intra-oral scanning techniques.

However, when planning the orthodontic treatment, it may be practical to apply a texture, defined by various textural parameters, such as colors, shades, translucency values, and the like, to the respective 3D digital models of the above-mentioned subject's intraoral anatomical structures. For example, the texture may be applied to more accurately differentiate mesh elements representative of the given lower tooth 16 from those representative of the lower gingiva 14 to monitor intermediate positions thereof within the lower arch form 10 in the course of the orthodontic treatment.

In another example, the texture may be applied to the respective 3D digital model of the lower arch form 10 to differentiate mesh elements corresponding to different portions of the given lower tooth 16—such as a crown portion (not separately labelled) and a root portion (not depicted) thereof. This may allow simulating certain movements of the given lower tooth 16 within the lower arch form 10 to prevent certain undesired effects, which may be caused to the subject during the implementation of the orthodontic treatment. More specifically, the texture may allow the practicing clinician to monitor a position of a tooth-gingiva boundary 18 between the given lower tooth 16 and the lower gingiva 14 when planning movements of the given lower tooth 16 including its extrusion to prevent exposure of the root portion thereof, which may result, for example, in increased chances of development of tooth decay or pain in the exposed area. In another example, monitoring the tooth-gingiva boundary 18 based on the applied texture when planning movements of the given lower tooth 16 including intrusion thereof may enable to prevent impaction of the crown portion of the given lower tooth 16 into the lower gingiva 14, which may result in damaging the lower gingiva 14 and surrounding tissues further associated with pain, bleeding in the affected area, and the like.

Further, the application of texture may aid the subject in understanding certain aspects of the planned orthodontic treatment before the implementation thereof. This may help the subject to overcome certain fears associated with receiving the forthcoming orthodontic treatment, including, for example, the fear of the unknown, fear of pain, and fear of failure to achieve the planned result of the orthodontic treatment. Further, preventing such anxieties before providing the orthodontic treatment may thus allow enhancing subject's adherence to the orthodontic treatment, thereby increasing its overall effectiveness.

Also, using the texturized respective 3D digital models of the subject's intraoral anatomical structures may allow visualizing different variants of the orthodontic treatment, which can be offered to the subject for treating a given malocclusion. More specifically, implementation of the different variants of the orthodontic treatment may include, for example, using implants, pontics, extracting at least some of the subject's teeth, bone incision, and the like—which may further result in different respective cosmetic appearances of the subject's anatomical structures. Accordingly, the texturized respective 3D digital models may be used for visualization of such variants of the orthodontic treatment and respective effects thereof onto the anatomical structures to the subject, before providing the orthodontic treatment.

The texture may be applied directly to a respective 3D digital model of a given subject's intraoral anatomical structure. However, as mentioned above, conventional approaches to applying the texture in such a way may require considerable computational resources of a processor used for execution thereof due to processing large numbers of chaotically scattered vertices of the respective 3D digital models.

Thus, certain non-limiting embodiments of the present technology are directed to methods and systems for applying the at least one textural parameter to the respective 3D digital model of the given subject's intraoral anatomical structure to generate a respective augmented 3D digital model thereof by using a predetermined texture reference map. To that end, the present methods are directed to (i) generating a 2D grid being an unfolded representation of the respective 3D digital model of the given subject's intraoral anatomical structure, each cell of which corresponds to a respective mesh element of the respective 3D digital model; (ii) determining 2D coordinates defining respective cells of the 2D grid; (iii) assigning the values of the at least one textural parameter to the respective cells of the 2D grid; and (iv) causing application of the at least one textural parameter to the respective 3D digital model by transferring the values thereof from the cells of the 2D grid to respective mesh elements of the respective 3D digital model. Additionally, for determining the 2D coordinates of the respective cells within the 2D grid more efficiently, the present methods may further comprise, prior to the generating the 2D grid, redistributing vertices within a surface of the respective 3D digital model in an ordered manner, such as uniformly.

Thus, using such a texture reference map may allow reducing consumption of computational resources of the computing system, including its processor and GPU, for applying the at least one texture to the respective 3D digital model. This may enable to generate the respective augmented 3D digital model of the given subject's intraoral anatomical structure over a shorter time allowing further increasing efficiency of determining the orthodontic treatment for the subject.

How the texture reference map can be generated, according to certain non-limiting embodiments of the present technology, will be described in greater detail below with reference to FIGS. 6 to 12.

System

Figure 4:
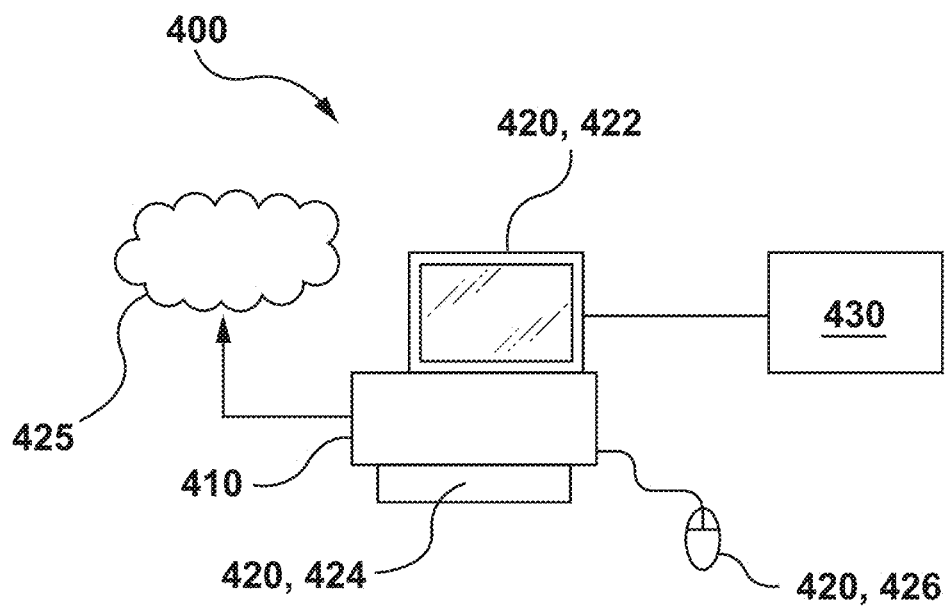
FIG. 4 depicts a schematic diagram of a system for generating augmented 3D digital models of some intraoral anatomical structures of the subject present in FIG. 1, in accordance with certain embodiments of the present technology.
Figure 5:
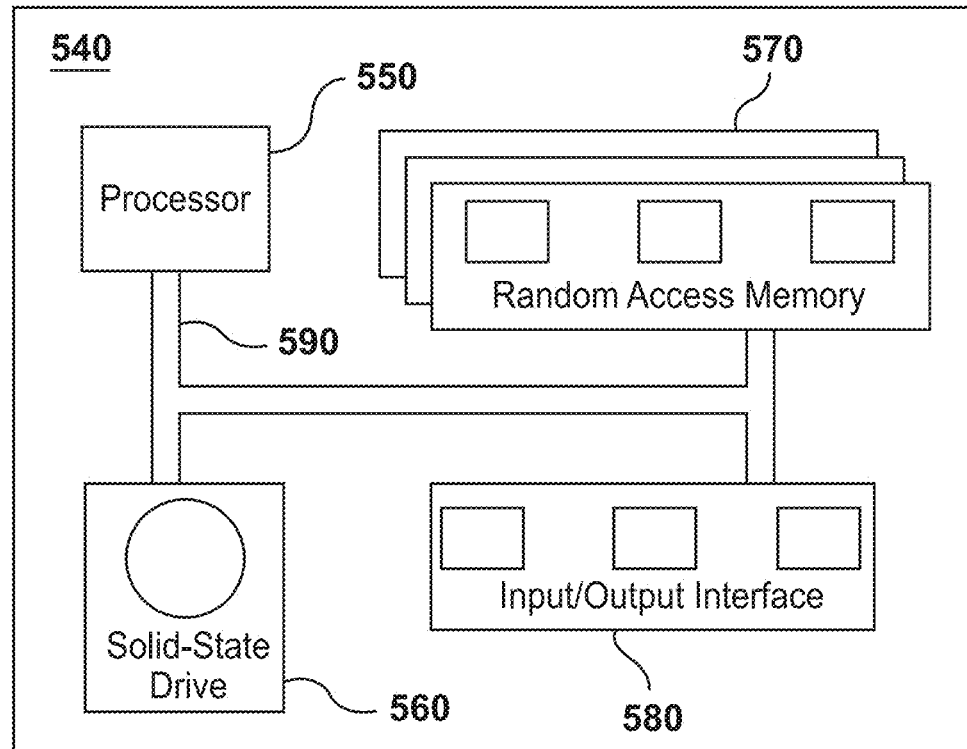
FIG. 5 depicts a schematic diagram of a computing environment of the system of FIG. 4, in accordance with certain embodiments of the present technology.

With reference to FIGS. 4 and 5, there is depicted a schematic diagram of a system 400 suitable for generating the respective augmented 3D digital model of the given subject's intraoral anatomical structure, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to determine, based on image data associated with the subject, such as the respective 3D digital models of the given subject's intraoral anatomical structure, the respective augmented 3D digital model thereof. In additional non-limiting embodiments of the present technology, the computer system 410 may further be configured to determine the orthodontic treatment for the subject using the respective augmented 3D digital model, as will be described below.

To that end, in some non-limiting embodiments of the present technology, the computer system 410 may be configured to receive the image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data of the given subject's intraoral anatomical structure from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In some non-limiting embodiments of the present technology, the computer system 410 may be configured to receive the image data associated with the subject directly from an imaging device 430 communicatively coupled thereto. Broadly speaking, the processor 550 may be configured to cause the imaging device 430 to capture and/or process the image data of the lower teeth 12 and the periodontium (not depicted) of the subject. In certain non-limiting embodiments of the present technology, the image data may include, for example, one or more of: (1) images of external surfaces of respective crown portions of the lower teeth 12, (2) images of an external surface of the periodontium including those of the lower gingiva 14, the alveolar mandibular bone (not depicted), and images of superficial blood vessels and nerve pathways associated with the lower teeth 12; and (3) images of an oral region. By doing so, the imaging device 430 may be configured, for example, to capture image data of the lower arch form 10 of the subject. In another example, the imaging device may also be configured to capture and/or process image data of an upper arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling to capture direct optical impressions of the at least one of the lower arch form 10 and the upper arch form 11 of the subject.

In a specific non-limiting example, the intraoral scanner can be of one of the types available from MEDIT, CORP, of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold (not depicted) representing the given configuration of the at least one of the lower arch form 10 and the upper arch form 11 associated with the respective stage of the orthodontic treatment. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from DENTAL WINGS, INC. of 2251, ave Letourneux, Montreal (QC), Canada, H1V 2N9. It should be expressly understood that the desktop scanner can be implemented in any other suitable equipment.

In yet other non-limiting embodiments of the present technology, the imaging device 430 can comprise a 3D laser scanner enabling to obtain a respective point cloud 3D digital model of the at least one of the lower arch form 10 and the upper arch form 11—such as by scanning the mold thereof and thus registering three-dimensional coordinates of points representative of the surface of the mold.

In a specific non-limiting example, the 3D laser scanner can be of one of the types available from LASER DESIGN of 5900 Golden Hills Drive, Minneapolis, Minn. 55416. It should be expressly understood that the desktop scanner can be implemented in any other suitable equipment.

In yet other non-limiting embodiments of the present technology, the imaging device 430 may comprise a cone beam computed tomography (CBCT) scanner. Generally speaking, the CBCT scanner comprises software and hardware allowing for capturing data using a cone-shaped X-ray beam by rotating around the subject's head. This data may be used to reconstruct 3D digital models of the following regions of the subject's anatomy: dental (teeth and gum, for example): oral and maxillofacial region (mouth, jaws, and neck); and ears, nose, and throat ("ENT").

In a specific non-limiting example, the CBCT scanner can be of one of the types available from 3Shape, Private Limited Company of Holmens Kanal 7, 1060 Copenhagen, Denmark. It should be expressly understood that the CBCT scanner can be implemented in any other suitable equipment.

Further, it is contemplated that the computer system 410 may be configured for processing of the received image data. The resulting image data of the lower arch form 10 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (for example, STL, OBJ, PLY, DICOM, and various software-specific, proprietary formats). Any image data file format is included within the scope of the present technology. For implementing functions described above, the computer system 410 may further comprise a corresponding computing environment.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random-access memory 570 and an input/output interface 580. Communication between the various components of the computing environment 540 may be enabled by one or more internal and/or external buses 590 (for example, a Peripheral Component Interconnect (PCI) bus, a universal serial bus (USB), IEEE 1394 "Firewire" bus, a Small Computer System Interface (SCSI) bus, a Serial AT Attachment (Serial-ATA) bus, an Aeronautical Radio Incorporated (ARINC) bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring™. The specific physical layer and the data link layer may provide a base for a full network protocol stack, allowing communication among small groups of computers on the same local area network (LAN) and large-scale network communications through routable protocols, such as IP.

According to implementations of the present technology, the solid-state drive 560 stores program instructions suitable for being loaded into the random-access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

Thus, in some non-limiting embodiments of the present technology, the computing environment 540 may further include a graphics processing unit (GPU, not depicted) configurable to render graphics for display on a screen of the system 400, such as a screen 422, in accordance with instructions of the processor 550.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the at least one interface device 420 being in communication with the input/output interface 580. In the embodiment of FIG. 4, the at least one interface device is the screen 422. In other non-limiting embodiments of the present technology, the at least one interface device 420 may be a monitor, a speaker, a printer or any other device for providing an output in any form such as an image form, a written form, a printed form, a verbal form, a 3D model form, or the like.

In the depicted embodiments of FIG. 4, the at least one interface device 420 also comprises a keyboard 424 and a mouse 426 for receiving input from the user of the system 400. In other non-limiting embodiments of the present technology, the at least one interface devices 420 may be configured for providing an input to the computer system 410; and can thus further include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Image Data

As alluded to above, according to certain non-limiting embodiments of the present technology, the processor 550 may be configured to: (1) receive the respective 3D digital model of the given subject's intraoral anatomical structure; (2) apply to the respective 3D digital model at least one textural parameter to generate the respective augmented 3D digital model; and (3) determine, from the respective augmented 3D digital model, the orthodontic treatment for the subject.

In some non-limiting embodiments of the present technology, the at least one textural parameter may include, without limitation, a color parameter, a light intensity parameter, a dimming parameter, and a transparency parameter. Thus, by assigning different values of the at least one textural parameter to respective predetermined portions of the respective 3D digital model of the given subject's intraoral anatomical structure, the processor 550 may be configured to apply the texture to the respective 3D digital model, thereby generating the respective augmented 3D digital model of the given subject's intraoral anatomical structure.

As mentioned above, in some non-limiting embodiments of the present technology, the given subject's intraoral anatomical structure may be a subject's tooth, such as the given lower tooth 16 depicted in FIG. 1. In other non-limiting embodiments of the present technology, the given subject's intraoral anatomical structure may, for example, be a subject's gingiva, such as the lower gingiva 14 depicted in FIG. 1. However, it should be noted that, in various non-limiting embodiments of the present technology, using the imaging device 430 as described above, the processor 550 may be configured to receive respective 3D digital models of other subject's intraoral anatomical structure, such as a subject's tongue, soft and hard palates as well as a floor of a subject's mouth, subject's tonsils, and the like, without departing from the scope of the present technology.

Further, it should be noted that the present methods and systems are not limited to subject's intraoral anatomical structures, and may be used for generating respective augmented 3D digital models of other subject's anatomical structures, such as, without limitation, a subject's skull, and separate bones thereof (such as a subject's maxilla, for example), organs of the head and neck of the subject further including subject's eyes and surrounding tissues, a subject's nose, as an example.

Thus, it should be expressly understood that although the description hereinbelow will be provided in respect of the given lower tooth 16 for the sake of clarity and simplicity thereof, and in no way as a limitation, non-limiting embodiments of the present technology may also be applied to any other anatomical structure of the subject which will be explicitly indicated below where necessary.

Thus, in some-non-limiting embodiments of the present technology, using the imaging device 430, the processor 550 can be configured to obtain a tooth 3D digital model (such as a tooth 3D digital model 902 depicted in FIG. 9) of the given lower tooth 16. For example, in those embodiments where the imaging device 430 is the CBCT scanner, the processor 550 may be configured to receive the tooth 3D digital model directly from the imaging device 430.

However, in other non-limiting embodiments of the present technology, where the imaging device 430 is the intraoral scanner, for example, the processor 550 may be configured to generate the tooth 3D digital model 902 of the given lower tooth 16 based on a 3D digital model of a current configuration of the lower arch form 10 of the subject.

Figure 6:
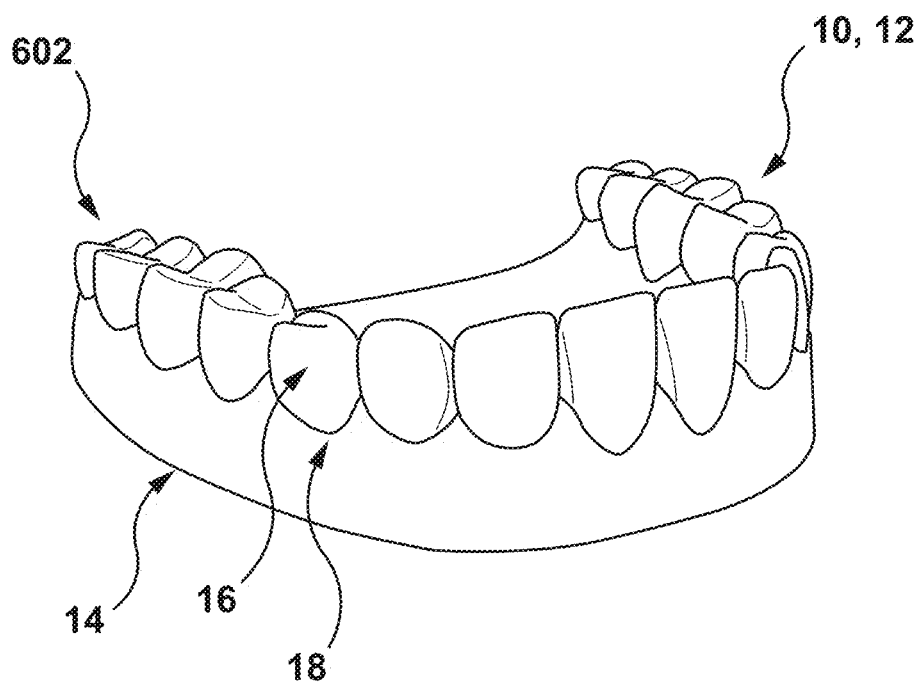
FIG. 6 depicts a 3D digital model of one of the subject's arch forms present in FIG. 1 used, by a processor of FIG. 5, to generate augmented 3D digital models of at least some intraoral anatomical structures of the subject, in accordance with certain non-limiting embodiments of the present technology.

With reference to FIG. 6, there is schematically depicted a perspective view of an arch form 3D digital model 602 of the lower arch form 10 used, by the processor 550, for generating the tooth 3D digital model 902 of the given lower tooth 16, in accordance with certain non-limiting embodiments of the present technology.

In some non-limiting embodiments of the present technology, the processor 550 may be configured to receive, from the imaging device 430, the arch form 3D digital model 602 comprising a respective plurality of mesh elements (not depicted) representative of a surface of the lower arch form 10. For example, the imaging device 430 can be configured to generate the plurality of mesh elements including, without limitation, triangular mesh elements, quadrilateral mesh elements, convex polygonal mesh elements, or even concave polygonal mesh elements, as an example, without departing from the scope of the present technology.

Further, to generate the tooth 3D digital model 902, in some non-limiting embodiments of the present technology, the processor 550 may be configured to (1) isolate a 3D digital model of the crown portion of the given lower tooth 16 from adjacent teeth and gingiva; and optionally (2) based on the 3D digital model of the crown portion, reconstruct a 3D digital model of the root portion of the given lower tooth 16; and (3) merge the 3D digital model of the crown portion and the 3D digital model of the root portion of the given lower tooth 16.

Figure 7:
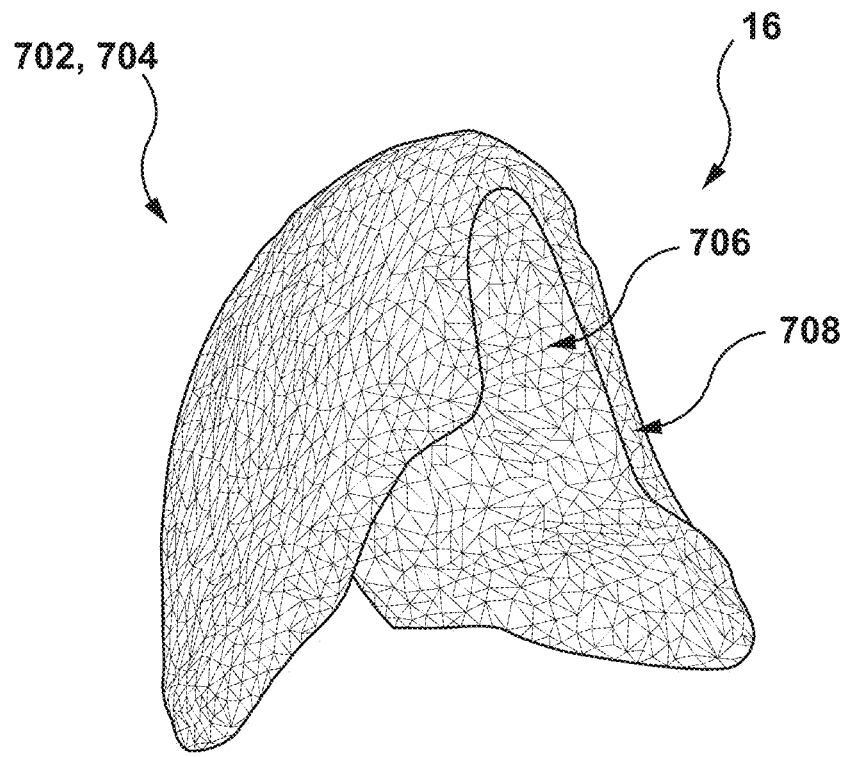
FIG. 7 depicts a 3D representation of a crown portion of a given tooth of the subject isolated, by the processor of FIG. 5, from the 3D digital model of FIG. 6, in accordance with certain non-limiting embodiments of the present technology.

With reference to FIG. 7, there is schematically depicted a perspective view of a crown 3D digital model 702 of the crown portion of the given lower tooth 16 used, by the processor 550, for generating the tooth 3D digital model 902 thereof, in accordance with certain non-limiting embodiments of the present technology.

How the processor 550 can be configured to isolate the crown 3D digital model 702 is not limited; and, in some non-limiting embodiments of the present technology, the processor 550 can be configured to apply, to the arch form 3D digital model 602, one or more automatic tooth segmentation approaches described in a co-owned U.S. Pat. No. 10,950,061-B1 issued on Mar. 16, 2021, entitled "SYSTEMS AND METHODS FOR PLANNING AN ORTHODONTIC TREATMENT", content of which is incorporated herein by reference in its entirety.

More specifically, to generate the crown 3D digital model 702 associated with the given lower tooth 16, the processor 550 may be configured to: (i) acquire the arch form 3D digital model 602 of the lower arch form 10 of the subject, the arch form 3D digital model 602 comprising a defined portion forming part of a surface of the given lower tooth 16, and at least one undefined portion not forming part of the surface of the given lower tooth 16; the arch form 3D digital model 602 comprising the plurality of mesh elements having a plurality of vertices comprising: constrained vertices associated with the defined portion, each constrained vertex having a normal constrained vertex vector; unconstrained vertices initially associated with the undefined portion, each unconstrained vertex having a normal unconstrained vertex vector; (ii) generate a set of confirmed constrained vertices 704, including the constrained vertices associated with the defined portion, for providing the crown 3D digital model 702 of the crown portion of the given lower tooth 16 by: (iii) iteratively, for a given constrained vertex, identifying at least one associated unconstrained vertex which is adjacent to the given constrained vertex in the plurality of mesh elements; (iv) determining an angular difference between the normal constrained vertex vector of the given constrained vertex and the normal unconstrained vertex vector of the at least one associated unconstrained vertex; (v) in response to the angular difference being equal to or below a predetermined threshold value; identifying the at least one associated unconstrained vertex to be a constrained vertex associated with the defined portion for inclusion in the set of confirmed constrained vertices 704; (vi) in response to the angular difference being above the predetermined threshold value: identifying the at least one associated unconstrained vertex to be an unconstrained vertex associated with the undefined portion for exclusion from the set of confirmed constrained vertices 704.

In additional non-limiting embodiments of the present the present technology, the processor 550 may further be configured to perform a smoothing operation on the set of confirmed constrained vertices 704 defining the crown 3D digital model 702 to fill in gaps 10 therein—such as a given gap 706, formed as a result of the isolating the crown 3D digital model 702 in the arch form 3D digital model 602.

To that end, according to specific non-limiting embodiments of the present technology, the processor 550 may be configured to apply one or more Harmonic functions to the crown 3D digital model 702 of the given lower tooth 16, thereby restoring a smooth surface thereof within the given gap 706.

In the context of the present specification, the term "Harmonic function" relates to the field of mathematical physics and denotes a function that satisfies Laplace's equation. Accordingly, applying the one or more Harmonic functions for restoring the smooth surface within the given gap 706 of the crown 3D digital model 702 may be associated with setting certain boundary conditions.

Thus, according to some non-limiting embodiments of the present technology, the boundary conditions for the one or more Harmonic functions may comprise vertex coordinates and respective vertex normal vectors (not separately depicted in FIG. 7) defined at respective vertices of the set of confirmed constrained vertices 704, which are located at an edge 708 of the given gap 706 of the crown 3D digital model 702. By doing so, the processor 550, using the one or more Harmonic functions, can be said to "patch" the given gap 706 within the crown 3D digital model.

Also, according to some non-limiting embodiments of the present technology, the processor 550 may be configured to re-mesh the surface of the crown 3D digital model 702 to redistribute the set of confirmed constrained vertices 704 uniformly therewithin.

Further, as noted above, optionally the processor 550 may be configured to generate the 3D digital model of the root portion based on the crown 3D digital model 702. It is not limited how the processor 550 may be configured to generate the 3D digital model of the root portion; however, in some non-limiting embodiments of the present technology, the processor 550 may be configured to generate the 3D digital model of the root portion based on reference data associated with the given lower tooth 16 applying one or more approaches described in a co-owned U.S. patent application Ser. No. 16/936,937 filed on Jul. 23, 2020, entitled "SYSTEMS AND METHODS FOR PLANNING AN ORTHODONTIC TREATMENT", content of which is incorporated herein by reference in its entirety.

More specifically, in some non-limiting embodiments of the present technology, the reference data associated with the given lower tooth 16 may include, without limitation, at least one of a number of root branches of the root portion; approximate overall dimensions of the given lower tooth 16 including those of the crown portion and the root portion thereof. Also, in some non-limiting embodiments of the present technology, the reference data associated with the given lower tooth 16 may further include a base parametric 3D model of the root portion; and the processor 550 can be configured to generate the 3D digital model of the root portion of the given lower tooth 16 based on the base parametric model.

Figure 8:
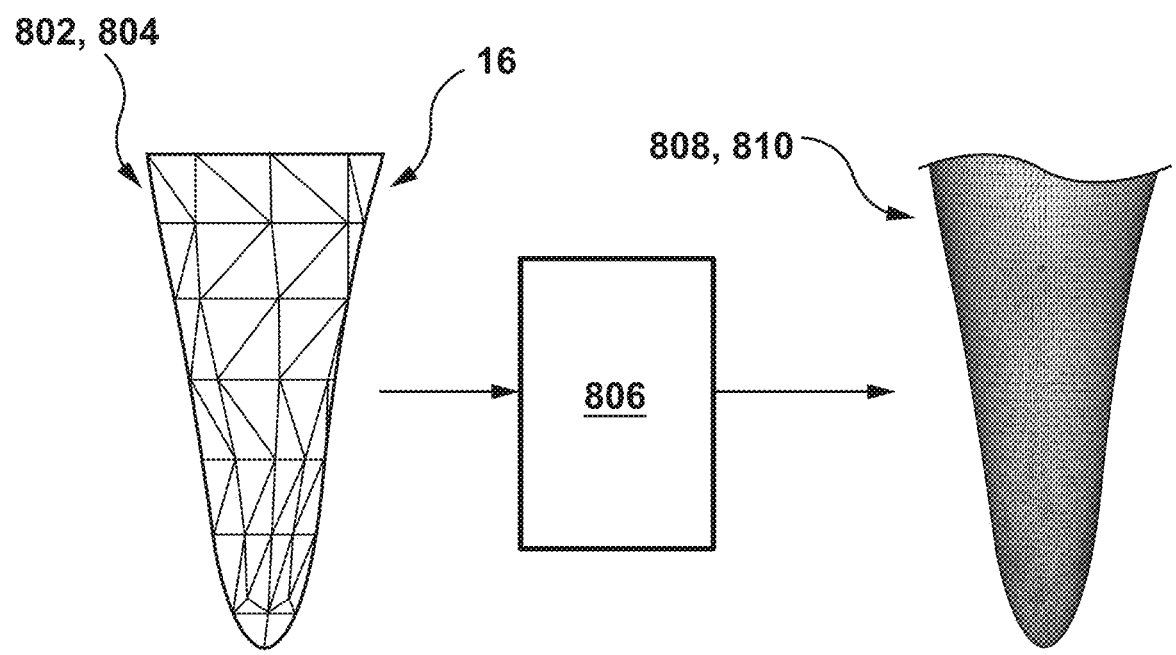
FIG. 8 depicts a schematic diagram of a process for generating, by the processor of FIG. 5, a 3D digital model of a root portion of the given tooth of the subject based on a parametric model thereof, according to certain embodiments of the present technology.

With reference to FIG. 8, there is depicted a base parametric 3D digital model 802 for the root portion of the given lower tooth 16 used, by the processor 550, for generating a root 3D digital model 808 thereof, in accordance with certain non-limiting embodiments of the present technology.

According to certain non-limiting embodiments of the present technology, the base parametric 3D digital model 802 may comprise a plurality of coarse root mesh elements 804 that may further be smoothed, by the processor 550, thereby generating the root 3D digital model 808 of the root portion of the given lower tooth 16.

In some non-limiting embodiments of the present technology, the smoothing may be based on a subdivision algorithm 806, to which the processor 550 may be provided access. Broadly speaking, the subdivision algorithm 806 may be configured to iteratively subdivide each one of the plurality of coarse root mesh elements 804 into smaller ones of a plurality of root mesh elements 810 indicative of a desired level of granularity of the root 3D digital model 808.

In some non-limiting embodiments of the present technology, the processor 550 may be configured to iteratively apply the subdivision algorithm 806 until a distribution of vertices of the plurality of root mesh elements 810 along the root 3D digital model 808 corresponds to that of the set of confirmed constrained vertices 704 associated with the crown 3D digital model 702 depicted in FIG. 7.

In specific non-limiting embodiments of the present technology, the subdivision algorithm 806 may be a Catmull-Clark subdivision algorithm; however, in other non-limiting embodiments of the present technology, the subdivision algorithm 806 may further include a Doo-Sabin subdivision algorithm, a Loop subdivision algorithm, a Midedge subdivision algorithm, and a Kobbelt subdivision algorithm, as an example.

It should further be noted that the processor 550 may be configured to verify, at each iteration of applying the subdivision algorithm 806, if dimensions of the root 3D digital model 808 correspond to the approximate overall dimensions of the root portion of the given lower tooth 16 (such as a length thereof, for example) received as part of the reference data thereof, and adjust discrepancies therebetween.

Figure 9:
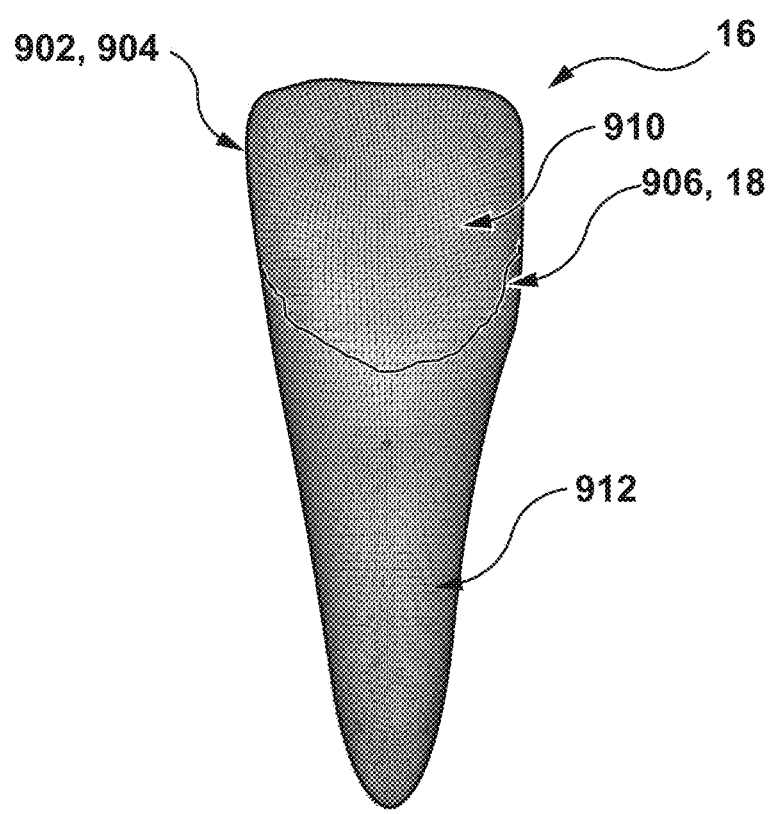
FIG. 9 depicts a schematic diagram of the 3D digital model of the given tooth of the subject generated by the processor of FIG. 5 based on the 3D digital model of the crown portion of FIG. 7 and the 3D digital model of the root portion of FIG. 8, according to certain non-limiting embodiments of the present technology.

Thus, having generated the root 3D digital model 808, in some non-limiting embodiments of the present technology, the processor 550 may be configured to merge it with the crown 3D digital model 702 to generate the tooth 3D digital model 902 of the given lower tooth 16, a schematic diagram of which is depicted in FIG. 9, in accordance with certain non-limiting embodiments of the present technology.

According to some non-limiting embodiments of the present technology, after merging the crown 3D digital model 702 and the root 3D digital model 802, the processor 550 may additionally be configured to smooth a surface of the tooth 3D digital model 902 using one or more Harmonic functions as described above.

Thus, the processor 550 may be configured to generate the tooth 3D digital model 902 comprising a plurality of tooth mesh elements 904 whose vertices are distributed along the surface thereof uniformly.

Also, in alternative non-limiting embodiments of the present technology, the processor 550 can be configured to retrieve the tooth 3D digital model 902 prepared for applying the at least one textural parameter thereto. For example, the processor 550 can be configured to retrieve the tooth 3D digital model 902 from a memory of the computing environment 540—such as from one of the solid-state drive 560 and the random-access memory 570, or via the input/output interface 580.

Further, in those embodiments where the given subject's intraoral anatomical structure is the lower gingiva 14 of the subject, the processor 550 may be configured to obtain a gingiva 3D digital model (not depicted) thereof in a fashion similar to that described above with respect to the tooth 3D digital model 902 of the given lower tooth 16. More specifically, if the imaging device 430 is the CBCT scanner, the processor 550 may be configured to receive the gingiva 3D digital model directly therefrom. However, in other non-limiting embodiments of the present technology, the processor 550 can be configured to reconstruct the gingiva 3D digital model of the lower gingiva 14 from the arch form 3D digital model 602 depicted in FIG. 6.

It is not limited how the processor 550 can be configured to reconstruct the gingiva 3D digital model from the arch form 3D digital model 602; and in specific non-limiting embodiments of the present technology, the processor 550 can be configured to apply an approach described in a co-owned U.S. Pat. No. 10,945,812-B1 issued on Mar. 16, 2021, entitled "SYSTEMS AND METHODS FOR PLANNING AN ORTHODONTIC TREATMENT", content of which is incorporated herein by reference in its entirety. More specifically, to generate the gingiva 3D digital model of the lower gingiva 14 according to these embodiments, the processor 550 can be configured to: (i) acquire the arch form 3D digital model 602 of the lower arch form 10 of the subject, the arch form 3D digital model 602 including data of a transverse plane associated with a skull of the subject; the transverse plane being associated with a common median axis lying therein and a common vertical axis perpendicular thereto; (ii) segment, in the arch form 3D digital model 602, associated representations of the lower teeth 12 and the lower gingiva 14 to generate a plurality of segmentation loops, each segmentation loop being respectively associated with each tooth of the lower teeth 12 and representing an interface therebetween and the lower gingiva 14; (iii) determine, between each adjacent two segmentation loops of the plurality of segmentation loops, a midpoint, thereby generating a plurality of primary midpoints for the plurality of segmentation loops; (iv) based on the plurality of midpoints, generate a primary central curve; (v) generate, based on the primary central curve, a first inner mesh curve and a first outer mesh curve, the first inner mesh curve positioned along a first horizontal plane and the first outer mesh curve positioned along a second horizontal plane, both the first horizontal plane and the second horizontal plane being parallel to the transverse plane and being vertically offset, along the common vertical axis, from a highest vertex of the plurality of segmentation loops; the first inner mesh curve being offset along the common median axis posteriorly relative to the primary central curve along the first horizontal plane, and the first outer mesh curve being offset along the common median axis anteriorly relative to the primary central curve along the second horizontal plane; (vi) project the plurality of primary midpoints onto the first inner mesh curve and the first outer mesh curve, thereby generating a first plurality of inner midpoints and a first plurality of outer midpoints; and (vii) generating a first segment of the gingiva 3D digital model (not depicted) of the lower gingiva 14 by joining each one from the plurality of primary midpoints with respective ones from the first plurality of inner midpoints and from the first plurality of outer midpoints.

Similarly, in alternative non-limiting embodiments of the present technology, rather than generating the gingiva 3D digital model of the lower gingiva 14 based on the arch form 3D digital model 602, the processor 550 may be configured to receive the gingiva 3D digital model of the lower gingiva 14 from one of the solid-state drive 560 and the random-access memory 570, or via the input/output interface 580.

In additional non-limiting embodiments of the present technology, the processor 550 can also be configured to re-mesh a surface of the gingiva 3D digital model (not depicted) re-distributing vertices thereof uniformly; and further adjust granularity of the gingiva 3D digital model by applying, mutatis mutandis, thereto the subdivision algorithm 806 as described above.

As it may be appreciated, the respective 3D digital model of the given subject's intraoral structure thus received, such as the tooth 3D digital model 902 of the given lower tooth 16, is an untextured representation thereof. In other words, there is no color, surface details, and visual properties applied thereto. Mesh elements of the tooth 3D digital model 902 representative of the root portion thereof are not visually distinguishable from those representative of the crown portion thereof. How the processor 550 can be configured to apply the at least one textural parameter to the tooth 3D digital model 902, thereby generating an augmented tooth 3D digital model (such as an augmented tooth 3D digital model 1102 depicted in FIG. 11) of the given lower tooth 16 will be described immediately below with reference to FIGS. 10 to 12.

Generating a Texture Reference Map

As noted hereinabove, in accordance with certain non-limiting embodiments of the present technology, the processor 550 can be configured to apply the at least one textural parameter to the tooth 3D digital model 902 using a respective texture reference map.

However, in some non-limiting embodiments of the present technology, prior to generating the respective texture reference map, the processor 550 can be configured to determine portions of the tooth 3D digital model 902 that would have different values of the at least one textural parameter. For example, the processor 550 may be configured to determine, in the tooth 3D digital model 902, portions representative of the crown portion and the root portion of the given lower tooth 16.

To that end, with continued reference to FIG. 9, in some non-limiting embodiments of the present technology, the processor 550 may be configured to apply, on the tooth 3D digital model 902, a tooth-gingiva segmentation loop 906 indicative of the tooth-gingiva boundary 18 between the given lower tooth 16 and the lower gingiva 14. The tooth-gingiva segmentation loop 906 can thus be used to segment the tooth 3D digital model 902 into a first portion 910 and a second portion 912 respectively representative of the crown portion and the root portion of the given lower tooth 16.

In some non-limiting embodiments of the present technology, the processor 550 can be configured to determine the tooth-gingiva segmentation loop 906 as a closed curve extending along an edge of the crown 3D digital model 702 generated as described above with reference to FIG. 7.

In other non-limiting embodiments of the present technology, the processor 550 may be configured to obtain the tooth-gingiva segmentation loop 906 having been previously generated by third-party software, based on the arch form 3D digital model 602, and data indicative thereof may have been stored in a data format, in which the processor 550 may be configured to receive it, for example, via the input/output interface 580.

In yet other non-limiting embodiments of the present technology, the tooth-gingiva segmentation loop 906 may be generated manually, for example, by a practicing clinician involved in the determining the orthodontic treatment. For example, the practicing clinician may manually apply the tooth-gingiva segmentation loop 906 onto the arch form 3D digital model 602, using respective suitable software, and the processor 550 may further be configured to receive the arch form 3D digital model 602, and detect the tooth-gingiva segmentation loop 906 applied thereon.

It should be noted that determining only two portions within the tooth 3D digital model 902, that is, the first portion 910 and the second portion 912, for assigning thereto different respective values of the at least one textural parameter is described herein only for purposes of clarity of explanation of the non-limiting embodiments of the present technology, and not as a limitation; and in other non-limiting embodiments of the present technology, more than two portions within the tooth 3D digital model 902 representative of other structures of the given lower tooth 16 may be identified. By way of example, using one of the methods described above, the processor 550 may be configured to identify, in the tooth 3D digital model 902, one or more cusps of the crown portion of the given lower tooth 16, one or more grooves of the crown portion of the given lower tooth 16, an apical portion of the root portion of the given lower tooth 16, and the like. Further, the processor 550 may be configured to assign, to the so identified portions, respective different values of the at least one textural parameter, which may further allow for visual differentiation thereof within the augmented tooth 3D digital model 1102 of the given lower tooth 16, as will be described below.

Further, in some non-limiting embodiments of the present technology, based on the tooth 3D digital model 902 with identified thereon at least the first portion 910 and the second portion 912, the processor 550 may be configured to generate the respective texture reference map.

To that end, in some non-limiting embodiments of the present technology, first, the processor 550 can be configured to generate a 2D grid associated with the tooth 3D digital model 902.

Figure 10:
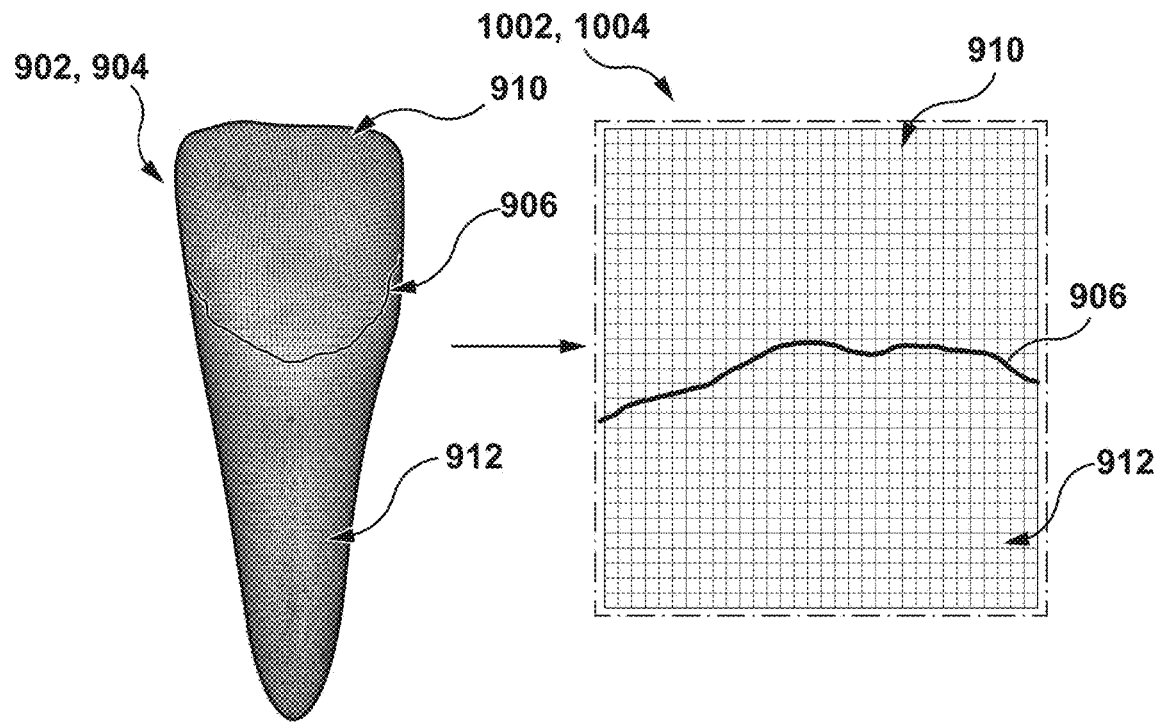
FIG. 10 depicts a schematic diagram of a process for unfolding, by the processor of FIG. 5, a surface of the 3D digital model of the given tooth of the subject to generate a 2D grid associated therewith, according to certain non-limiting embodiments of the present technology.

With reference to FIG. 10, there is depicted a schematic diagram of a step of generating a 2D grid 1002 associated with the tooth 3D digital model 902, which can further be used, by the processor 550, for generating the respective texture reference map, in accordance with certain non-limiting embodiments of the present technology.

In some non-limiting embodiments of the present technology of the present technology, the processor 550 can be configured to generate the 2D grid 1002 by unfolding the surface of the tooth 3D digital model 902 into a 2D surface. To that end, in some non-limiting embodiments of the present technology, the processor 550 can be configured to apply one or more surface unfolding algorithms including, for example, a flange geometry unfolding algorithm and locally bulged geometry unfolding algorithm. In other non-limiting embodiments of the present technology, the one or more surface unfolding algorithms may further include a UV mapping surface unfolding algorithm.

Thus, in these embodiments, the processor 550 can be configured to transform each one the plurality of tooth mesh elements 904 of the tooth 3D digital model 902 into a respective one of a plurality of 2D cells 1004 of the 2D grid 1002. Further, as it may be appreciated, in some non-limiting embodiments, the processor 550 may thus be configured to preserve the distribution of vertices within the plurality of tooth mesh elements 904 within cells of the plurality of 2D cells 1004. In other words, in those embodiments where the vertices of the plurality of tooth mesh elements 904 are distributed uniformly, they will be distributed uniformly within the plurality of 2D cells 1004 as well. Thus, by generating the 2D grid 1002, the processor 550 can be configured to decrease dimensionality of the tooth 3D digital model 902 while preserving an original distribution of vertices thereof.

Further, as best shown in FIG. 10, the plurality of 2D cells 1004 thus includes cells representative of respective portions of the tooth 3D digital model 902 including the first portion 910, the second portion 912, and the tooth-gingiva segmentation loop 906. Thus, according to certain non-limiting embodiments of the present technology, the processor 550 can be configured to assign respective values of the at least one textural parameter to cells of the plurality of 2D cells 1004 representative of the respective portions of the tooth 3D digital model 902, thereby generating the respective texture reference map associated therewith.

More specifically, the processor 550 can be configured to assign (1) a first value of the at least one textural parameter to cells of the plurality of 2D cells 1004 corresponding to the first portion 910 of the tooth 3D digital model 902 and (2) a second value of the at least one textural parameter to cells of the plurality of 2D cells 1004 corresponding to the second portion 912 of the tooth 3D digital model 902. In some non-limiting embodiments of the present technology, the first value of the at least one textural parameter can be different from the second value thereof. By way of example, in those embodiments where the at least one textural parameter is the color parameter, the first value and the second value thereof may be representative of different colors (determined, for example, as color values within a given color palette, such as Red Green Blue (RGB)) to be applied to the first portion 910 and the second portion 912 of the tooth 3D digital model 902, respectively.

Further, in some non-limiting embodiments of the present technology, the processor 550 can be configured to assign a third value of the at least one textural parameter to cells of the plurality of 2D cells 1004 corresponding to the tooth-gingiva segmentation loop 906. In some non-limiting embodiments of the present technology, the third value of the at least one textural parameter can be different from the first value and the second value thereof.

In some non-limiting embodiments of the present technology, the processor 550 can be configured to determine the third value of the at least one textural parameter based on the first value and the second value thereof. More specifically, the processor 550 can be configured to determine the third value as an average value between the first value and the second value. However, it should be noted that, in other non-limiting embodiments of the present technology, to determine the third value, the processor 550 can be configured to apply a different coefficient to a combination (such as a sum, a multiplication, and the like) of the first value and the second value, such as 0.2, 0.3, 0.8, or even 1.5, as an example.

Figure 11:
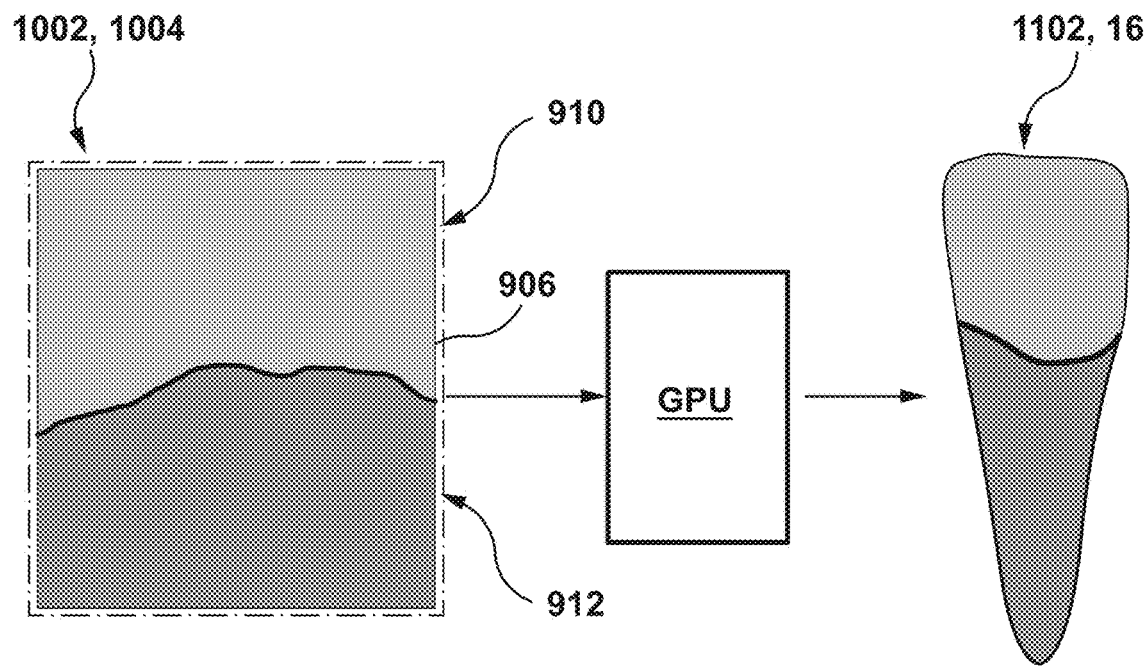
FIG. 11 depicts a schematic diagram of a process for assigning, by the processor of FIG. 5, values of at least one textural parameter to respective portions of the 2D grid to be used by a graphics processing unit to apply the at least one textural parameter to the 3D digital model of the given toot of the subject, according to certain non-limiting embodiments of the present technology.

With reference to FIG. 11, there is schematically depicted a process for generating, by the processor 550, the 2D grid 1002 including assigned values of the at least one textural parameter and using it, by the GPU of the computing environment 540, for generating the augmented tooth 3D digital model 1102, in accordance with certain non-limiting embodiments of the present technology.

As it can be appreciated from FIG. 11, each color within the 2D grid 1002 corresponds to a respective one of the first value, the second value, and the third value of the at least one textural parameter assigned to cells of the plurality of 2D cells 1004.

Thus, the 2D grid 1002 including the first value, the second value, and the third value of the at least one textural parameter assigned to cells thereof representative of the first portion 910, the second portion 912, and the tooth-gingiva segmentation loop 906 can thus be used by the processor 550 as the respective texture reference map for applying the at least one textural parameter to the tooth 3D digital model 902.

In this regard, using the so generated respective texture reference map, according to certain non-limiting embodiments of the present technology, the processor 550 can be configured, by providing respective instructions, to cause the GPU of the computing environment 540 to apply the values of the at least one textural parameter from the plurality of the 2D cells 1004 of the 2D grid 1002 to respective ones of the plurality of tooth mesh elements 904 of the tooth 3D digital model 902, thereby generating the augmented tooth 3D digital model 1102 of the given lower tooth 16.

Thus, by preprocessing the tooth 3D digital model 902 of the given lower tooth 16 to generate the respective texture reference map associated therewith, the processor 550 may thus be configured to reduce the computational burden on the GPU when rendering the augmented tooth 3D digital model 1102.

Figure 12A:
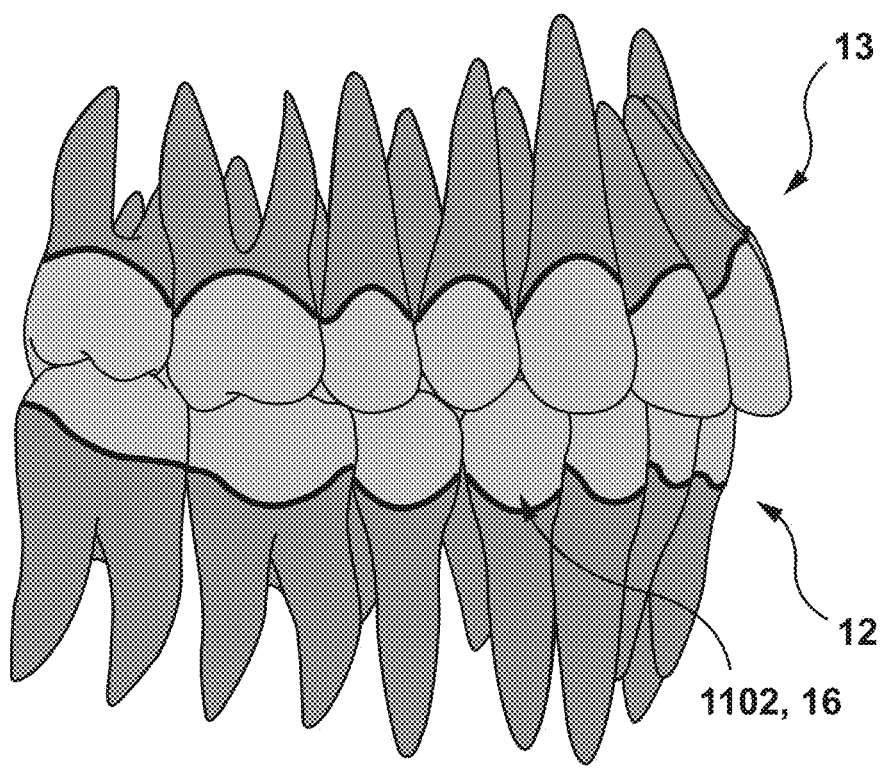
FIGS. 12A and 12B depict respective augmented 3D digital models of the intraoral anatomical structures of the subject present in FIG. 1, in accordance with certain non-limiting embodiments of the present technology.

Thus, by applying mutatis mutandis, a similar approach for applying texture as described above with reference to FIGS. 6 to 11 with respect to the given lower tooth 16, the processor 550 can be configured to generate respective tooth 3D digital models of each one of the lower teeth 12 and the upper teeth 13, and further apply the at least one textural parameter thereto, thereby generating their respective augmented tooth 3D digital models, which are schematically depicted in FIG. 12A, in accordance with certain non-limiting embodiments of the present technology.

Figure 12B:
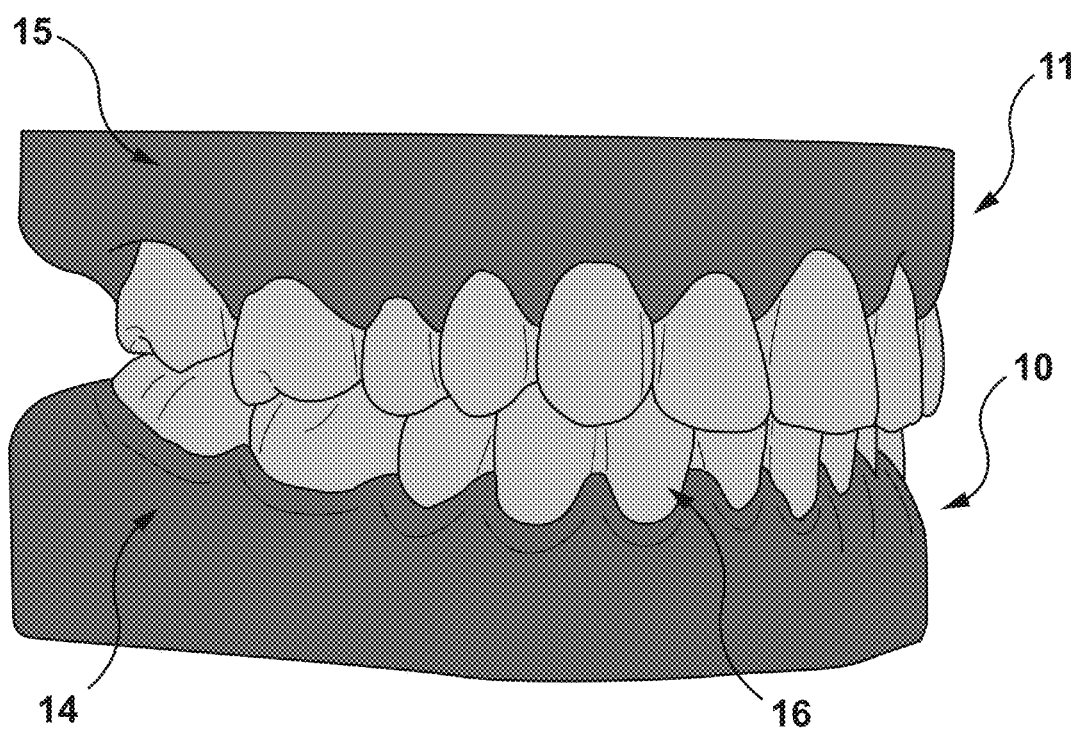

Further, as mentioned above, in additional non-limiting embodiments of the present technology, the processor 550 may be configured to generate respective augmented gingiva 3D digital models of the lower gingiva 14 and the upper gingiva 15 in a similar fashion to that described above in respect of the given lower tooth 16. Further, the processor 550 can be configured to merge the respective augmented tooth 3D digital models of the lower teeth 12 and the upper teeth with the respective augmented gingiva 3D digital models of the lower gingiva 14 and the upper gingiva 15 to generate respective augmented arch form 3D digital models of the lower arch form 10 and the upper arch from 11, which are schematically depicted in FIG. 12B, in accordance with certain non-limiting embodiments of the present technology.

Further, in some non-limiting embodiments of the present technology, using the so generated respective augmented arch form 3D digital models of the lower arch form 10 and the upper arch form 11, the processor 550 may further be configured to model tooth movements of at least some of the lower teeth 12 and the upper teeth 13 of the subject to target positions thereof associated with their alignment to determine the orthodontic treatment. In specific non-limiting embodiments of the present technology, to determine the orthodontic treatment, the processor 550 may be configured to apply one or more approaches described in a co-owned U.S. patent application Ser. No. 17/014,107 filed on Sep. 8, 2020, and entitled "SYSTEMS AND METHODS FOR DETERMINING A TOOTH TRAJECTORY,", the content of which is incorporated herein by reference in its entirety.

In other non-limiting embodiments of the present technology, to determine the orthodontic treatment, the processor 550 can be configured to execute one or more methods described in a co-owned U.S. patent application Ser. No. 17/338,143 concurrently filed with the present application, and entitled "SYSTEMS AND METHODS FOR DETERMINING AN ORTHODONTIC TREATMENT", content of which is incorporated herein by reference in its entirety.

Accordingly, the augmented arch form 3D digital models of the lower arch form 10 and the upper arch form 11 can be generated with reduced computational resources. The so generated augmented arch form 3D digital models can be used for determining orthodontic treatments with (1) increased safety of the orthodontic treatment, which may be achieved, for example, by a more accurate modelling of the tooth movements of at least some of the lower teeth 12 and the upper teeth 13, allowing manufacture of the aligner 20 not causing damage to the subject, as described above; and (2) increased effectiveness of the orthodontic treatment, for example, by a more detailed explanation of the planned orthodontic treatment to the subject enabling to increasing adherence thereof during receiving the orthodontic treatment.

In additional non-limiting embodiments of the present technology, the processor 550 may be configured to store the respective augmented arch form 3D digital models of the lower arch form 10 and the upper arch form 11 in one of the solid-state drive 560 and the random-access memory 570 for further causing the GPU to display the augmented arch form 3D digital models on a display, such as the screen 422. The augmented arch form 3D digital models may be displayed on the screen 422, for example, for examining positions of at least some of the lower teeth 12 and the upper teeth 13 during the modelling of tooth movements thereof by the practicing clinician, who may further manually amend the orthodontic treatment determined as described above based on her/his expertise.

Method

Figure 13:
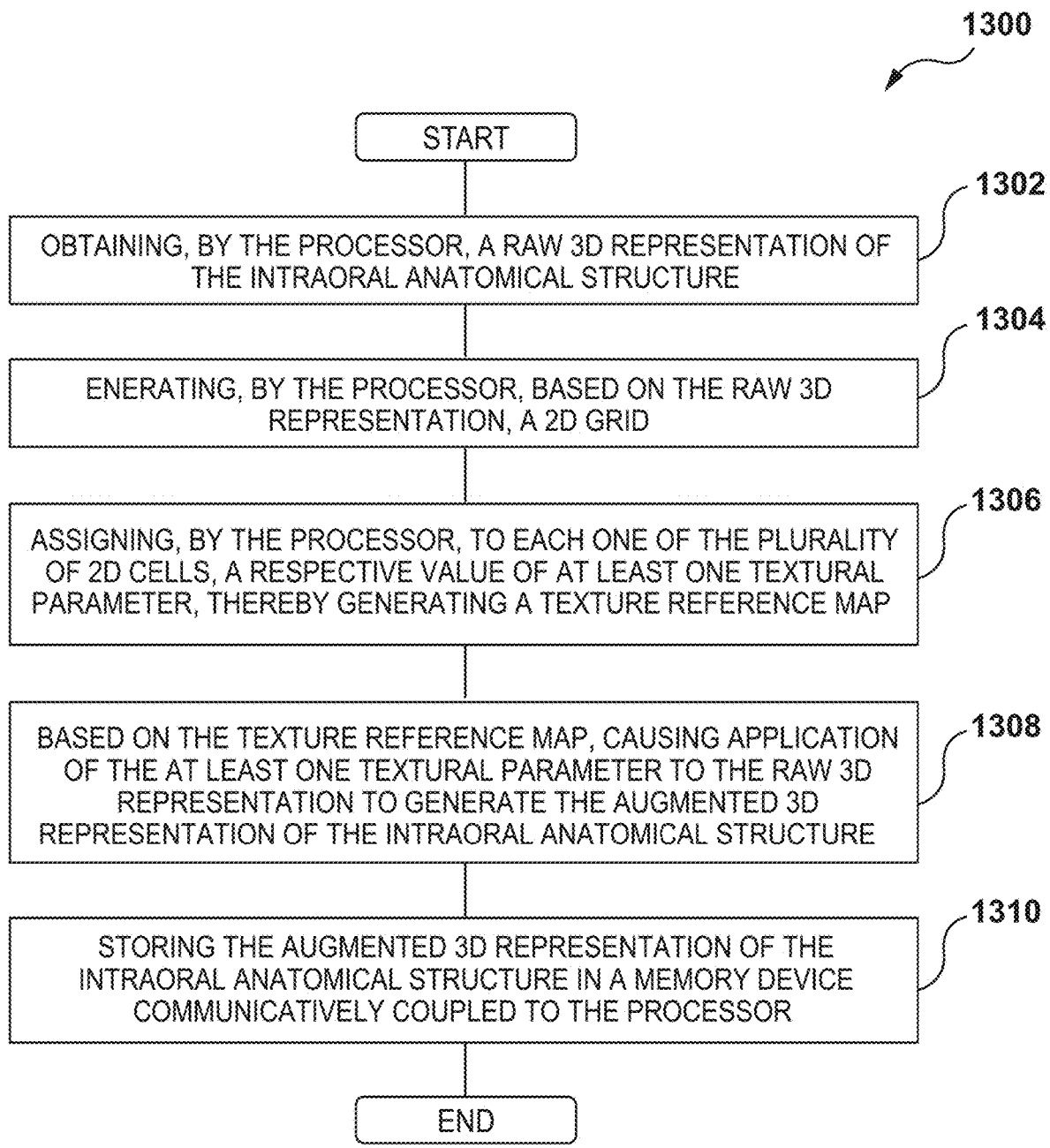
FIG. 13 depicts a flowchart of a method for generating the respective augmented 3D digital models of the intraoral anatomical structures of the subject present in FIG. 1, according to certain embodiments of the present technology.

Given the architecture and the examples provided hereinabove, it is possible to execute a method for generating an augmented 3D digital model of a subject's intraoral anatomical structure—such as the augmented tooth 3D digital model 1102 of the given lower tooth 16. With reference now to FIG. 13, there is depicted a flowchart of a method 1300, according to certain non-limiting embodiments of the present technology. The method 1300 may be executed by the processor 550 of the system 400.

Step 1302: Obtaining, by the Processor, a 3D Digital Model of the Intraoral Anatomical Structure According to some non-limiting embodiments of the present technology, the method 1300 commences at step 1302 with the processor 550 being configured to receive or obtain the respective 3D digital model of the given subject's intraoral anatomical structure.

As mentioned above, in some non-limiting embodiments of the present technology, the given subject's intraoral anatomical structure may, for example, be a subject's tooth, such as the given lower tooth 16; and the processor 550 can be configured to obtain, for example, the tooth 3D digital model 902 of the given lower tooth 16 schematically depicted in FIG. 9. However, in other non-limiting embodiments of the present technology, the given subject's intraoral anatomical structure may be a subject's gingiva, such as the lower gingiva 14; and the processor 550 can thus be configured to obtain the gingiva 3D digital model (not depicted) of the lower gingiva 14.

Further, in some non-limiting embodiments of the present technology, the processor 550 can be configured to obtain each one of the tooth 3D digital model 902 and the gingiva 3D digital model directly from one of the solid-state drive 560, the random-access memory 570, and the input/output interface 580. However, in other non-limiting embodiments of the present technology, the processor 550 can be configured to generate each one of the tooth 3D digital model 902 and the gingiva 3D digital model by segmenting thereof from the arch form 3D digital model 602 as described above with reference to FIGS. 6 to 9. As further noted above, similarly, the processor 550 can be configured to obtain respective 3D digital models of other intraoral anatomical structures of the subjects, such as the subject's tongue, the palates, and the floor of the subject's mouth, without departing from the scope of the present technology.

As further noted above, the method 1300 is not limited to intraoral anatomical structures of the subject; and in some non-limiting embodiments of the present technology, the processor 550 can be configured to obtain respective 3D models of other anatomical structures of the subject, such as the subject's skull and separate structures thereof as well as certain organs thereof, for further applying the texture thereto in a similar fashion to that described below.

As further mentioned above, the processor 550 can be configured to obtain the respective 3D digital model comprising a plurality of mesh elements—such as the plurality of tooth mesh elements 904 of the tooth 3D digital model 902 associated with the given lower tooth 16.

Further, as it may be appreciated, the respective 3D digital model so obtained, such as the tooth 3D digital model 902, is an untextured 3D model, that is, there is no color, surface details, and visual properties applied thereto allowing visually distinguishing mesh elements thereof e from each other within the tooth 3D digital model 902. Thus, the processor 550 can be configured to apply the texture including the at least one textural parameter to the tooth 3D digital model 902 to generate an augmented 3D digital model of the given lower tooth 16—such as the augmented tooth 3D digital model 1102 described above.

Also, in additional non-limiting embodiments of the present technology, the processor 550 can be configured to re-mesh the surface of the tooth 3D digital model 902 such that the vertices thereof are distributed according to the predetermined rule—for example, uniformly. To that end, the processor 550 can be configured to apply a subdivision algorithm, such as the subdivision algorithm 806 described above with reference to FIG. 8.

As noted above, according to certain non-limiting embodiments of the present technology, the at least one textural parameter may include, without limitation, a color parameter, a light intensity parameter, a dimming parameter, and a transparency parameter, as an example. Thus, by applying different values of the at least one textural parameter to respective portions of the tooth 3D digital model 902, the processor 550 can be configured to apply the texture thereto to generate the augmented tooth 3D digital model 1102.

For example, the processor 550 can be configured to determine, within the tooth 3D digital model 902, the first portion 910 and the second portion 912 respectively representative of the crown portion and the root portion of the given lower tooth 16. To that end, in some non-limiting embodiments of the present technology, the processor 550 can be configured to apply the tooth-gingiva segmentation loop 906 to the tooth 3D digital model 902 as described above with reference to FIG. 9.

The method 1300 hence proceeds to step 1304.
Step 1304: Generating, by the Processor, Based on the 3D Digital Model, a 2D Grid At step 1304, according to certain non-limiting embodiments of the present technology, the processor 550 can be configured to generate, based on the tooth 3D digital model 902, a 2D grid—such as the 2D grid 1002. As described above, in some non-limiting embodiments of the present technology, the processor 550 can be configured to generate the 2D grid 1002 by unfolding the surface of the tooth 3D digital model 902 into a 2D surface using one or more surface unfolding algorithms, as described above with reference to FIG. 10.

Thus, as further noted with reference to FIG. 10, according to certain non-limiting embodiments of the present technology, the 2D grid 1002 includes the plurality of 2D cells that are respectively representative of the first portion 910, the second portion 912, and the tooth-gingiva segmentation loop 906 of the tooth 3D digital model 902.

The method 1300 thus proceeds to step 1306.
Step 1306: Assigning, by the Processor, to Each One of the Plurality of 2D Cells, a Respective Value of at Least One Textural Parameter, Thereby Generating a Texture Reference Map Further, at step 1306, according to certain non-limiting embodiments of the present technology, the processor 550 can be configured to assign to each one of the plurality of 2D cells 1004 of the 2D grid 1002. More specifically, as further described above with reference to FIG. 10, the processor 550 can be configured to assign (1) the first value of the at least one textural parameter to cells of the plurality of 2D cells 1004 corresponding to the first portion 910 of the tooth 3D digital model 902 and (2) the second value of the at least one textural parameter to cells of the plurality of 2D cells 1004 corresponding to the second portion 912 of the tooth 3D digital model 902. In some non-limiting embodiments of the present technology, the first value of the at least one textural parameter can be different from the second value thereof.

Further, in some non-limiting embodiments of the present technology, the processor 550 can be configured to assign the third value of the at least one textural parameter to cells of the plurality of 2D cells 1004 corresponding to the tooth-gingiva segmentation loop 906. In some non-limiting embodiments of the present technology, the third value of the at least one textural parameter can be different from the first value and the second value thereof.

In some non-limiting embodiments of the present technology, the processor 550 can be configured to determine the third value of the at least one textural parameter as an average value between the first value and the second value.

Thus, in some non-limiting embodiments of the present technology, the processor 550 can be configured to use the 2D grid 1002 including the values of at least one textural parameter assigned to respective ones of the plurality of 2D cells 1004 as the texture reference map for assigning the values of the at least one textural parameter to the tooth 3D digital model 902.

The method 1300 hence advances to step 1308.
Step 1308: Based on the Texture Reference Map, Causing Application of the at Least One Textural Parameter to the 3D Digital Model to Generate the Augmented 3D Digital Model of the Intraoral Anatomical Structure At step 1308, according to certain non-limiting embodiments of the present technology, the processor 550 can be configured, by providing respective instructions, to cause the GPU of the computing environment 540 to apply the values of the at least one textural parameter from the plurality of the 2D cells 1004 of the 2D grid 1002 to respective ones of the plurality of tooth mesh elements 904 of the tooth 3D digital model 902, thereby generating the augmented tooth 3D digital model 1102 of the given lower tooth 16.

Thus, by preprocessing the tooth 3D digital model 902 of the given lower tooth 16 to generate the respective texture reference map associated therewith, the processor 550 may thus be configured to reduce the computational burden on the GPU when rendering the augmented tooth 3D digital model 1102 depicted in FIG. 11.

As it may be appreciated, the processor 550 can be configured to apply, mutatis mutandis, steps 1302 to 1308 to a respective 3D digital model of any other subject's anatomical structure described above to generate a respective augmented 3D digital model thereof. For example, as described above with reference to FIGS. 12A and 12 B, the processor 550 may thus be configured to generate the respective augmented tooth 3D digital models of each one of the lower teeth 12 and the upper teeth 13, and further generate the respective augmented gingiva 3D digital models of each one of the lower gingiva 14 and the upper gingiva 15. Further, the processor 550 can be configured to merge the respective augmented gingiva 3D digital models with the respective augmented tooth 3D digital models to generate the respective augmented arch form 3D digital models of the lower arch form 10 and the upper arch from 11.

Further, in some non-limiting embodiments of the present technology, using the so generated respective augmented arch form 3D digital models of the lower arch form 10 and the upper arch form 11, the processor 550 may further be configured to model tooth movements of at least some of the lower teeth 12 and the upper teeth 13 of the subject to target positions thereof associated with their alignment to determine the orthodontic treatment using one of the methods described above.

The method 1300 hence advances to step 1310. STEP 1310: STORING THE AUGMENTED 3D DIGITAL MODEL OF THE INTRAORAL ANATOMICAL STRUCTURE IN A MEMORY DEVICE COMMUNICATIVELY COUPLED TO THE PROCESSOR Finally, at step 1310, in some non-limiting embodiments of the present technology, the processor 550 may be configured to store the respective augmented arch form 3D digital models of the lower arch form 10 and the upper arch form 11 in one of the solid-state drive 560 and the random-access memory 570 for further causing the GPU to display the augmented arch form 3D digital models on the screen 422, for example, for further use of the practicing clinician and/or the subject, as described above.

Thus, certain embodiments of method 1300 may allow reducing computational costs for generating the respective augmented 3D digital models of the subject's intraoral anatomical structures which may further translate in increased effectiveness and safety of the orthodontic treatment planned based on such 3D digital models.

The method 1300 thus terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating an augmented 3D digital model of an intraoral anatomical structure of a subject, the method executed by a processor, the method comprising:
   obtaining, by the processor, a 3D digital model of the intraoral anatomical structure,
      the 3D digital model including a plurality of mesh elements representative of a surface of the intraoral anatomical structure;
      the 3D digital model being an untextured 3D digital model of the intraoral anatomical structure;
   generating, by the processor, based on the 3D digital model, a 2D grid,
      the 2D grid comprising an unfolded surface of the 3D digital model;
      the 2D grid including a plurality of 2D cells, a given one of which corresponds to a respective one of the plurality of mesh elements of the 3D digital model;
   assigning, by the processor, to each one of the plurality of 2D cells, a respective value of at least one textural parameter, thereby generating a texture reference map;
   based on the texture reference map, causing application of the at least one textural parameter to the 3D digital model to generate the augmented 3D digital model of the intraoral anatomical structure;
   storing the augmented 3D digital model of the intraoral anatomical structure in a memory device communicatively coupled to the processor.

2. The method of claim 1, further comprising, prior to the generating the 2D grid, uniformly redistributing vertices of the plurality of mesh elements.

3. The method of claim 2, wherein the uniformly redistributing comprises applying a subdivision surface algorithm.

4. The method of claim 3, wherein the subdivision surface algorithm is a Catmull-Clark subdivision surface algorithm.

5. The method of claim 1, further comprising, prior to the generating the 2D grid, smoothing the 3D digital model by applying a Harmonic function.

6. The method of claim 1, wherein the unfolded surface of the 3D digital model includes at least two areas indicative of respective portions of the intraoral anatomical structure, and the method further comprises:
   assigning, to each one of the plurality of 2D cells associated with one of the at least two areas of the unfolded surface, a first value of the at least one textural parameter; and
   assigning, to each one of the plurality of 2D cells associated with an other one of the at least two areas of the unfolded surface, a second value of the at least one textural parameter,
   the second value being different from the first value.

7. The method of claim 6, wherein each one of the at least two areas are separated by a border line, and the method further comprises:
   assigning to each one of the plurality of 2D cells associated with the border line between the at least two areas of the unfolded surface, a third value of the at least one textural parameter,
   the third value being different from the second value and the first value.

8. The method of claim 7, wherein the third value is determined based on the first value and the second value of the at least one textural parameter.

9. The method of claim 8, wherein the third value is an average value between the first value and the second value of the at least one textural parameter.

10. The method of claim 7, wherein:
   the intraoral anatomical structure is a subject's tooth;
   the at least two areas of the unfolded surface of the 3D digital model are indicative of a crown portion and a root portion of the subject's tooth, respectively; and
   the border line between the at least two areas is indicative of a segmentation loop between the crown portion and the root portion of the subject's tooth.

11. The method of claim 10, further comprising, prior to the generating the 2D grid, restoring the root portion of the subject's tooth within the 3D digital model based on a parametric model of the root portion.

12. The method of claim 1, wherein the at least one textural parameter includes one or more of: a color parameter, a light intensity parameter, a dimming parameter, and a transparency parameter.

13. The method of claim 1, wherein the intraoral anatomical structure is at least one of: a subject's tooth and a subject's gingiva.

14. The method of claim 1, further comprising causing, by the processor, display of the augmented 3D digital model of the intraoral anatomical structure.

15. The method of claim 1, further comprising using the augmented 3D digital model of the intraoral anatomical structure for determining an orthodontic treatment for the subject.

16. A method of generating an augmented 3D digital model of an anatomical structure of a subject, the method executed by a processor, the method comprising:
- obtaining, by the processor, a 3D digital model of the anatomical structure,
  - the 3D digital model including a plurality of mesh elements representative of a surface of the anatomical structure;
  - the 3D digital model being an untextured 3D digital model of the anatomical structure:
- generating, by the processor, based on the 3D digital model, a 2D grid,
  - the 2D grid comprising an unfolded surface of the 3D digital model;
  - the 2D grid including a plurality of 2D cells, a given one of which corresponds to a respective one of the plurality of mesh elements of the 3D digital model;
- assigning, by the processor, to each one of the plurality of 2D cells, a respective value of at least one textural parameter, thereby generating a texture reference map;
- based on the texture reference map, causing application of the at least one textural parameter to the 3D digital model to generate the augmented 3D digital model of the anatomical structure;
- causing display of the augmented 3D digital model of the anatomical structure.

17. A system for generating an augmented 3D digital model of an intraoral anatomical structure of a subject, the system including:
- a processor;
- a non-transitory memory device storing instructions,
- the processor, upon executing the instructions, being configured to:
  - obtain a 3D digital model of the intraoral anatomical structure,
    - the 3D digital model including a plurality of mesh elements representative of a surface of the intraoral anatomical structure;
    - the 3D digital model being an untextured representation of the intraoral anatomical structure;
  - generate, based on the 3D digital model, a 2D grid,
    - the 2D grid comprising an unfolded surface of the 3D digital model;
    - the 2D grid including a plurality of 2D cells, a given one of which corresponds to a respective one of the plurality of mesh elements of the 3D digital model;
  - assign, to each one of the plurality of 2D cells, a respective value of at least one textural parameter, thereby generating a texture reference map;
  - based on the texture reference map, cause application of the at least one textural parameter to the 3D digital model to generate the augmented 3D digital model of the intraoral anatomical structure;
  - store the augmented 3D digital model of the intraoral anatomical structure in the non-transitory memory device.

18. The system of claim 17, wherein prior to generating the 2D grid, the processor is further configured to redistribute vertices of the plurality of mesh elements uniformly.

19. The system of claim 18, wherein the to redistribute the vertices uniformly, the processor is configured to apply a subdivision surface algorithm.

20. The system of claim 17, wherein the at least one textural parameter includes one or more of: a color parameter, a light intensity parameter, a dimming parameter, and a transparency parameter.

* * * * *